(12) United States Patent
Gupta et al.

(10) Patent No.: US 11,593,979 B2
(45) Date of Patent: Feb. 28, 2023

(54) EDITING RASTER IMAGES UTILIZING PART-LEVEL SEMANTIC AWARE TRANSFORMATIONS

(71) Applicant: Adobe Inc., San Jose, CA (US)

(72) Inventors: Angad Kumar Gupta, Ghaziabad (IN); Ashwani Chandil, Noida (IN)

(73) Assignee: Adobe Inc., San Jose, CA (US)

( * ) Notice: Subject to any disclaimer, the term of this patent is extended or adjusted under 35 U.S.C. 154(b) by 48 days.

(21) Appl. No.: 17/242,615

(22) Filed: Apr. 28, 2021

(65) Prior Publication Data

US 2022/0366623 A1    Nov. 17, 2022

(51) Int. Cl.
   *G06T 11/60*    (2006.01)
   *G06T 7/11*     (2017.01)

(52) U.S. Cl.
   CPC ........... *G06T 11/60* (2013.01); *G06T 7/11* (2017.01); *G06T 2207/20081* (2013.01); *G06T 2207/20084* (2013.01)

(58) Field of Classification Search
   CPC . G06T 11/60; G06T 7/11; G06T 2207/20081; G06T 2207/20084
   See application file for complete search history.

(56) References Cited

U.S. PATENT DOCUMENTS

| | | | | |
|---|---|---|---|---|
| 7,876,325 B1 * | 1/2011 | Sharma | ............ | G06T 11/60 345/589 |
| 8,160,345 B2 * | 4/2012 | Pavlovskaia | ........ | G06T 7/13 382/131 |
| 10,140,764 B2 | 11/2018 | Wampler | | |
| 10,460,214 B2 | 10/2019 | Lu et al. | | |
| 11,030,361 B2 * | 6/2021 | Mariappasamy | ....... | G06F 30/23 |
| 11,259,874 B1 * | 3/2022 | Landon | .......... | G16H 40/67 |
| 11,403,434 B2 * | 8/2022 | Rockwood | ......... | G06T 17/10 |
| 2017/0365103 A1 * | 12/2017 | Nijlunsing | ......... | G06T 19/20 |

(Continued)

OTHER PUBLICATIONS

U.S. Appl. No. 17/202,019, entitled Generating Modified Digital Images Using Deep Visual Guided Patch Match Models for Image Inpainting; filed Mar. 15, 2021; applicant Adobe Inc.

(Continued)

*Primary Examiner* — David T Welch
(74) *Attorney, Agent, or Firm* — Keller Preece PLLC

(57) ABSTRACT

The present disclosure relates to systems, non-transitory computer-readable media, and methods for implementing part-level semantic aware transformations when editing digital images. For example, the disclosed systems identify a user selection designating an active region of a subpart (e.g., an object portion) to modify in a shape-constrained manner. Additionally, in certain implementations, the disclosed systems identify another user selection to designate an influenced region comprising adjoining areas connected to the active region. In some embodiments, the disclosed systems generate a boundary vector path outlining the active region and the influenced region. Furthermore, the disclosed systems can determine transformation constraints corresponding to specific path segments of the boundary vector path. Using such transformation constraints, the disclosed systems can generate a modified digital image that maintains shape and other properties for the subpart (and the object) when transforming the active region of the subpart.

20 Claims, 17 Drawing Sheets

(56) References Cited

U.S. PATENT DOCUMENTS

| | | | |
|---|---|---|---|
| 2019/0206100 A1* | 7/2019 | Batra | G06T 11/60 |
| 2019/0340462 A1 | 11/2019 | Pao et al. | |
| 2019/0388123 A1* | 12/2019 | Pavlovskaia | A61B 90/37 |
| 2020/0151286 A1* | 5/2020 | Willis | G06F 30/00 |
| 2020/0156323 A1* | 5/2020 | Woytowitz | G06F 30/23 |
| 2020/0167981 A1* | 5/2020 | Tagra | G06T 11/60 |
| 2020/0211281 A1* | 7/2020 | Randon | G06T 17/205 |
| 2020/0334874 A1* | 10/2020 | Phogat | G06T 11/001 |
| 2021/0201571 A1* | 7/2021 | State | G06F 30/23 |
| 2021/0232120 A1* | 7/2021 | Marinov | G06T 17/30 |
| 2021/0366189 A1* | 11/2021 | Borduas | G06T 17/10 |

OTHER PUBLICATIONS

Adobe "Warp images, shapes, and paths"; date downloaded May 12, 2021; https://helpx.adobe.com/photoshop/using/warp-images-shapes-paths.html#puppet_warp.

Adobe "Use the Liquify filter"; date downloaded May 12, 2021; https://helpx.adobe.com/photoshop/using/liquify-filter.html.

* cited by examiner

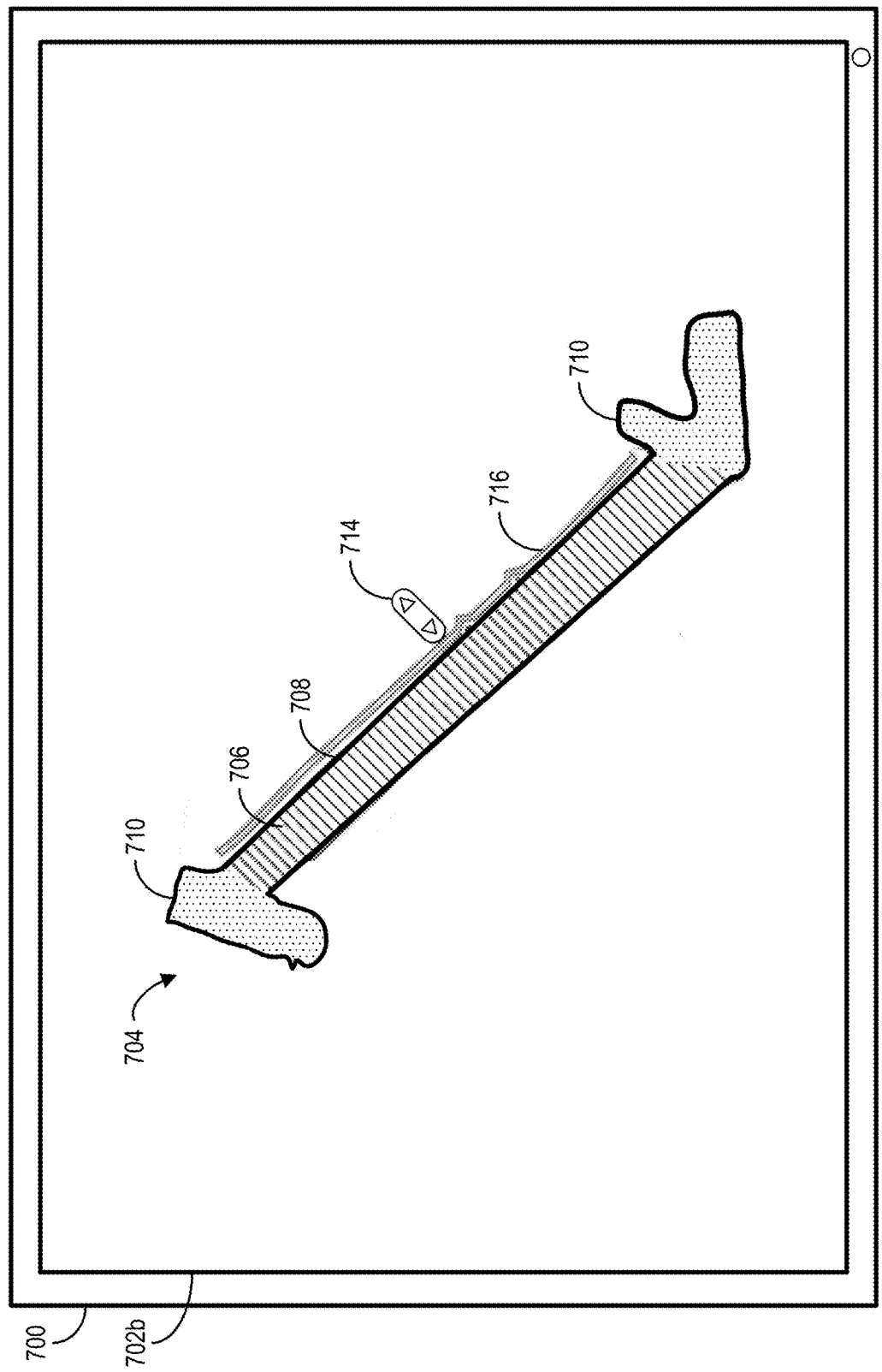

EDITING RASTER IMAGES UTILIZING PART-LEVEL SEMANTIC AWARE TRANSFORMATIONS

BACKGROUND

Recent years have seen significant advancement in hardware and software platforms that perform various tasks for editing digital images. In particular, many conventional digital image editing systems provide various tools that can be implemented for enhancing and transforming the visual appearance of a digital image. For example, conventional digital image editing systems provide tools that can be utilized to warp, skew, distort, re-color, or otherwise modify a digital image. Unfortunately, a number of problems exist with editing specific portions of an object portrayed in a digital image. For example, conventional digital image editing systems suffer from inflexible, inaccurate, and inefficient operation in editing subparts of objects portrayed in a digital image.

BRIEF SUMMARY

Embodiments of the present disclosure provide benefits and/or solve one or more of the foregoing or other problems in the art with systems, non-transitory computer-readable media, and methods that implement part-level semantic aware transformations when editing digital images. In particular, the disclosed systems can efficiently and accurately modify parts of an object while maintaining higher level structural relationships or constraints relative to surrounding portions of the object portrayed in the digital image. For example, the disclosed systems identify a user selection designating an active region of a subpart (e.g., an object portion) to modify in a shape-constrained manner. Additionally, in certain implementations, the disclosed systems identify another user selection to designate a region of influence (or hinge region) within the subpart as comprising the adjoining areas connected directly or indirectly to the active region.

In some embodiments, the disclosed systems generate a vector path outlining the active region and the region of influence. Furthermore, in some embodiments, the disclosed systems determine transformation constraints corresponding to specific segments of the vector path. Using such transformation constraints, one or more embodiments of the disclosed systems generate a modified digital image that maintains shape and other properties across the object when transforming the active region of the subpart. For instance, the disclosed systems intuitively translate the active region and morph the region of influence in response to detecting user interaction (e.g., dragging) with a user interface handle corresponding to the active region.

Additional features and advantages of one or more embodiments of the present disclosure are outlined in the following description.

BRIEF DESCRIPTION OF THE DRAWINGS

The detailed description provides one or more embodiments with additional specificity and detail through the use of the accompanying drawings, as briefly described below.

FIGS. 7A-7D illustrate a part-level transformation system providing user interfaces on a computing device in accordance with one or more embodiments.

DETAILED DESCRIPTION

Figure 1:
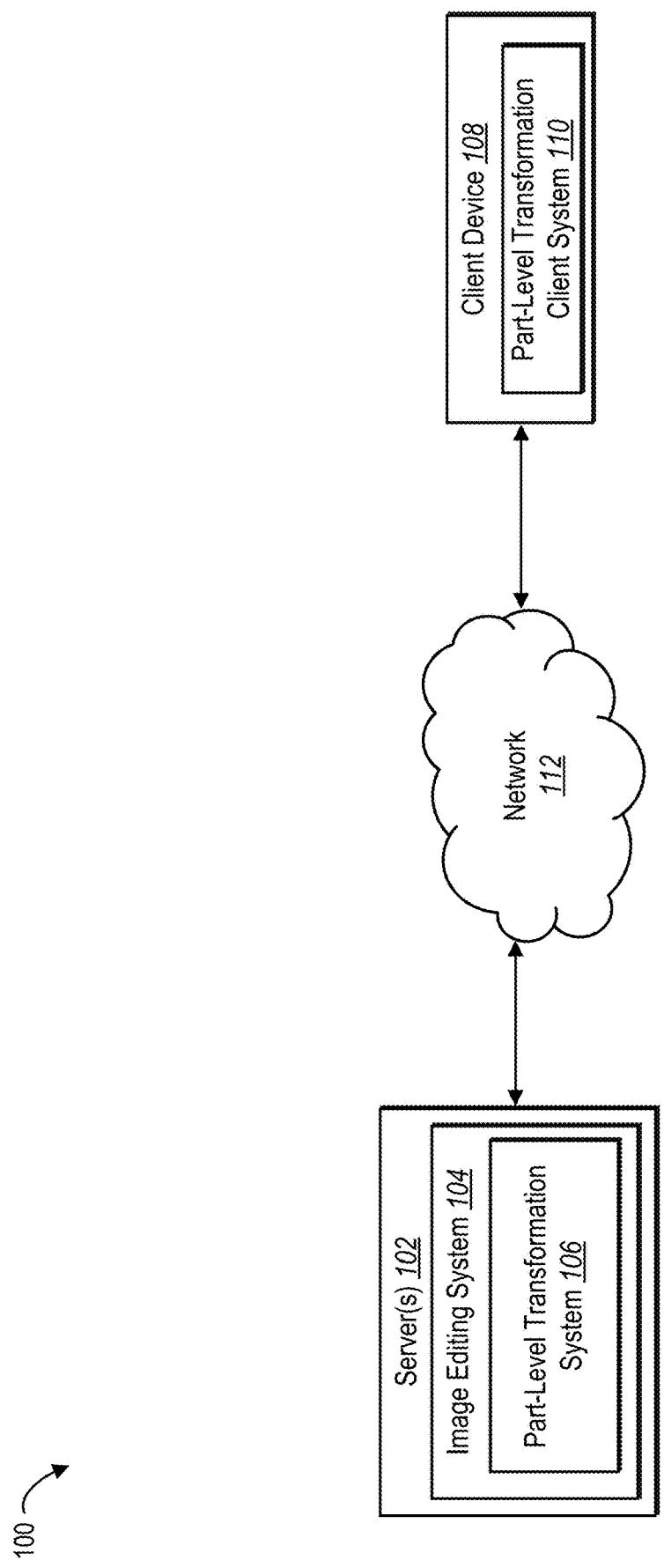
FIG. 1 illustrates a computing system environment for implementing a part-level transformation system in accordance with one or more embodiments.

One or more embodiments described herein include a part-level transformation system that intuitively transforms a subpart of an object in a digital image while maintaining overall structural constraints with regard to surrounding portions of the object. In particular, the part-level transformation system can provide an intuitive, accurate, and efficient approach to modifying a part of an object portrayed in a digital image while avoiding illogical deformations by constraining the part-level spatial deformation to particular directions, axes, and/or transformations dictated by the semantic arrangement of components within the digital image.

To illustrate, the part-level transformation system generates an object segmentation by processing a digital image utilizing an object detection algorithm. Upon generating an object segmentation, in one or more embodiments, the part-level transformation system identifies an active region and an influenced region from the object segmentation (e.g., based on user interaction with one or more selection tools via a user interface). In some embodiments, the part-level transformation system utilizes the active region and the influenced region to automatically infer constraints in accurately and realistically modifying a subpart of the digital image.

For example, the part-level transformation system creates a vector path surrounding the active region and the influenced region. Specifically, in one or more embodiments the vector path includes active path segments, deformable path segments, and/or fixed path segments. In certain implementations, each type of path segment corresponds to a set of corresponding transformation constraints that define (or limit) how the path segment can transform. The part-level transformation system then modifies the digital image based on user interactions and constraints for modifying the subpart of the object. For instance, in response to user interaction with a transformation handle displayed via a user interface, the part-level transformation system translates an active path segment, deforms a deformable path segment, and maintains a fixed path segment according to the user interaction and the segment-specific transformation constraints. In like manner, the part-level transformation system performs constraint-aware mesh deformation to modify the visual appearance of the subpart of the object within the digital image.

As mentioned above, in some embodiments, the part-level transformation system identifies an active region and influenced region of a subpart of an object portrayed in a digital image. For example, the part-level transformation system identifies the active region and the influenced region based on user interaction with a segmentation corresponding to the object. To illustrate, the part-level transformation system identifies the active region and the influenced region within the object segmentation based on respective user selections or digital indicators corresponding to one or more fill tools (or other digital selection tools) applied to a subpart. For instance, the part-level transformation system identifies the active region based on a first user input (e.g., a digital paint stroke) with a first paint color across a first subpart region. Similarly, for instance, the part-level transformation system identifies the influenced region based on a second user input (e.g., an additional digital paint stroke) with a second paint color across a second subpart region.

In some embodiments, the part-level transformation system generates a boundary vector path for the subpart. In particular embodiments, the part-level transformation system generates the boundary vector path by generating path segments that connect anchor points outlining the perimeter of the subpart along the active region and the influenced region. For example, the part-level transformation system generates at least one active path segment (e.g., a segment that translates or moves based on user interaction). In certain implementations, the part-level transformation system generates an active path segment by searching for and connecting anchor points along a perimeter edge of the active region up to an intersection anchor point positioned between the active region and the influenced region.

Additionally, for example, the part-level transformation system generates at least one deformable path segment that can deform (e.g., contract, expand, bend, etc.) when moving the subpart. In some embodiments, the part-level transformation system generates a deformable path segment by searching for and connecting anchor points along a perimeter edge of the influenced region between the intersection anchor point and a corner anchor point. The part-level transformation system can also generate fixed path segments for additional path segments that outline the perimeter of the subpart (e.g., fixed path segments that are unalterable to maintain proper joints or connections to adjoining subparts).

In one or more embodiments, the part-level transformation system infers transformation constraints between the active region and the influenced (e.g., hinge) region. To do so, certain implementations of the part-level transformation system impose transformation constraints specific to each path segment in order to preserve different properties and geometrical continuities. For example, the part-level transformation system determines a continuity constraint to preserve existing C1 smoothness and/or G1 curvature continuities according to input geometry of the subpart. As another example, the part-level transformation system determines a fixed affine constraint for mapping a fixed affine transformation (e.g., translation) of an active path segment to user gestures, such as a mouse drag or finger swipe. In yet another example, the part-level transformation system determines a similarity transform constraint to deform a deformable path segment according to a closest similarity transform. Other example types of transformation constraints include fixed constraints for fixed path segments and translation constraints for an active path segment based on slope thresholds or slope ranges (e.g., for translation in logical directions).

In some embodiments, the part-level transformation system provides one or more transformation handles for providing user gestures to modify the digital image. For example, the part-level transformation system provides a transformation handle (e.g., a moveable slider) in response to detecting a user interaction with an active path segment and/or the active region. In certain implementations, the transformation handle is specific to the detected user interaction. For instance, the part-level transformation system provides a transformation handle for translating only a single active path segment in response to detecting a user interaction (e.g., a mouse hover or haptic input) with respect to the single active path segment or associated boundary edge. In other instances, the part-level transformation system provides a transformation handle for simultaneously translating multiple active path segments corresponding to the active region based on a user interaction with an interior portion of the active region. Moreover, one or more embodiments of the part-level transformation system modify certain path segments of the boundary vector path in accordance with a user gesture applied to the transformation handle and the one or more transformation constraints. Further, in certain implementations, the part-level transformation system responds to transformation handle movement by updating a mesh defined according to a modified boundary vector path.

As mentioned above, a number of problems exist with conventional digital image editing systems, particularly with regard to flexibility, accuracy, and efficiency of implementing systems. For example, many conventional systems provide free-form deformation of digital images or digital image components. However, conventional digital image editing systems that utilize such approaches are unaware of joints or points of connections between subparts in an object and fail to provide tools that allow for intelligent editing of subparts. Indeed, such free-form approaches lack functionality and flexibility to deal with subparts that have semantic/structural relationships that need to be preserved in generating a modified digital image.

As a result, many conventional digital image editing systems generate modified digital images that inaccurately portray subparts of an object. For example, conventional digital image editing systems commonly leave holes or vacuums where connection points previously existed within an object portrayed in a digital image. Similarly, conventional digital image editing systems often unrealistically distort the size, shape, and/or curvature of subparts in response to modifying an object. Accordingly, conventional digital image editing systems often generate inaccurate, unrealistic digital images.

Further, some conventional digital image editing systems suffer from inefficient or complex user interface operations. For example, conventional digital image editing systems process an inordinate amount of user interfaces and user interactions to modify specific portions of an object. To illustrate, typical user interface operations of conventional digital image editing systems involve excessive trial and error to fill holes and remedy (or remove) artifacts. For instance, conventional digital image editing systems process numerous user inputs to match lighting, reflection and texture in modified areas of an object, correct color distortions in filled areas, and rectify joint/connection errors. Exacerbating these technical issues, certain conventional digital image editing systems require low pixel-level operation (e.g., edits performed while zoomed-in to lower pixel-count views). In these scenarios, conventional systems process an excessive amount of interface commands to repeatedly zoom-out and zoom-in to indicate different edits at different pixel locations and then repeatedly modify individual pixels or pixel regions.

In contrast, the part-level transformation system can improve flexibility, accuracy, and efficiency relative to conventional systems. digital image editing at the part-level by providing flexible, constraint-aware deformation tools, accurately modifying subparts of digital images, and providing a simplified, efficient approach that significantly reduces user interfaces and corresponding user interactions. For example, the part-level transformation system can provide flexible, semantic-aware tools to modify subparts of a digital images. In particular, the part-level transformation system can improve functionality by determining and utilizing transformation constraints to perform part-level deformation in a manner that maintains overall implicit structure. To illustrate, one or more embodiments of the part-level transformation system account for structural connections, pre-existing curvature, etc. by determining transformation constraints specific to classified regions within the subpart. Accordingly, the part-level transformation system can provide both free-form and semantically constrained digital image editing features to significantly improve the flexibility and functionality of implementing systems.

In addition, the part-level transformation system can more accurately modify subparts of an object in comparison to conventional digital image editing systems. For example, due to constraint-aware deformation, the part-level transformation system can maintain proper physical structure and avoid non-sensical transformations/modifications when moving a subpart. For example, the part-level transformation system can modify a mesh based on constrained vector transformations to automatically fill modified regions and deform adjacent portions of an object to create accurate, realistic modified objects. Thus, the part-level transformation system can avoid holes or blank areas between modified areas while automatically rendering consistent, accurate lighting effects and texture by using a mesh that transforms based on modified, constrained path segments of a vector boundary path.

Further, the part-level transformation system improves efficiency relative to conventional systems. For example, the part-level transformation system provides an intuitive, user interface that can modify subparts of a digital image with a handful of user interactions (e.g., three click and drag interactions). For example, a user can select an active region, an influenced region, and a modification, and the part-level transformation system can generate an enhanced digital image that translates the active region and deforms the influenced region while maintaining semantic constraints within the object. The part-level transformation system can significantly reduce the number of user interfaces, the volume of user interactions, and the amount of processing steps typical of conventional digital image editing systems in modifying (and fixing) a subpart of an object within a digital image. This directly translates into reduced computing resources (e.g., memory and processing power) required from implementing systems.

As illustrated by the foregoing discussion, the present disclosure utilizes a variety of terms to describe features and benefits of the part-level transformation system. Additional detail is now provided regarding the meaning of these terms. For example, as used herein, the term "object" refers to an image-based representation of an item, thing, character, person, animal, or machine. In particular embodiments, an object includes an item composed of or divisible into a plurality of subparts. Examples of an object include a human, bear, tree, bike, car, light fixture, table, chair, etc. as portrayed within a digital image.

Relatedly, as used herein, the term "subpart" refers to a portion of an object. In particular embodiments, a subpart includes a component, piece, or divisible portion of a segmentation of an object portrayed in a digital image. For example, a subpart includes an exhaust pipe on a motorcycle, bike frame tube(s), a support rod in a light fixture, etc.

As used herein, the term "active region" refers to a modifiable portion of an object/subpart of an object. In particular embodiments, an active region includes a portion of a subpart subject to one or more fixed affine transformations (e.g., scaling, rotation, and/or translation). For example, an active region includes a translatable portion of a subpart that, when moved, is not subject to deformation.

Additionally, as used herein, the term "influenced region" (or hinge region) refers to a deformable portion of an object/subpart of an object. In particular embodiments, an influenced region includes a portion of a subpart that is geometrically linked (e.g., directly or indirectly connected, dependent upon, or otherwise associated) with an active region. For example, an influenced region includes a portion of a subpart that undergoes a transformation in response to modifying an active region.

As used herein, the terms "transformation" or "deformation" refers to a modification. In particular embodiments, a transformation refers to an alteration or change implemented with regard to at least a portion of a digital image (e.g., pixels within the digital image). For example, in some implementations, a transformation includes a modification that warps, stretches, compresses, re-colors, or moves at least a portion of a digital image. In some implementations, a transformation further includes a modification to one or more digital elements that are associated with a digital image but are not part of the digital image itself. For example, in some embodiments, a transformation includes a modification to a mesh, boundary vector path, or a transformation handle that is associated with at least a portion of a digital image.

Further, as used herein, the term "boundary vector path" refers to a piecewise vector, spline, or path composed of one or more straight lines and/or curves (referred to as path segments). In particular embodiments, a boundary vector path includes a piecewise vector that corresponds to (e.g., approximates) a portion of a digital image, such as a subpart of an object. To illustrate, a boundary vector path can include a vector that surrounds an active region and an influenced region of a subpart of an object portrayed in a digital image. For example, in some implementations, a boundary vector path is composed of one or more of an active path segment, a deformable path segment, or a fixed path segment. Additionally or alternatively, a boundary vector path comprises one or more path segments that follow or approximate a perimeter (e.g., outer edge) of a subpart to define a corresponding mesh inside of the boundary vector path. In one or more embodiments, a boundary vector path is independent of the resolution of the underlying digital image.

Relatedly, as used herein, the term "active path segment" refers to a portion of a boundary vector path that corresponds to an active region of a subpart. In particular embodiments, an active path segment includes a path segment connecting two or more anchor points along an edge of an active region. Additionally, in one or more embodiments, an active path segment includes a path segment that is translatable according to one or more transformation constraints and based on user interaction with a transformation handle.

Similarly, as used herein, the term "deformable path segment" refers to a portion of a boundary vector path that corresponds to an influenced region of a subpart. In particular embodiments, a deformable path segment includes a path segment connecting two or more anchor points along an edge of an influenced region. For instance, a deformable path segment includes a path segment that undergoes some transformation (e.g., shortening, extension, bending, warping, or other adjustment) in response to translation of an active path segment.

Further, as used herein, the term "fixed path segment" refers to a portion of a boundary vector path that corresponds to a fixed region of an object/subpart that is not subject to modification. For example, a fixed path segment remains constant and unaltered in response to movement of an active path segment and/or deformation of a deformable path segment.

In addition, as used herein, the term "transformation constraint" refers to a computer-implemented parameter or algorithm for restricting or controlling movement of one or more portions of a boundary vector path. In particular embodiments, a transformation constraint corresponds to the type of path segment of the boundary vector path. For example, a transformation constraint for an active path segment can include a fixed affine constraint (e.g., one or more parameters for applying path segment scaling, rotation, and/or translation). As another example, a transformation constraint for a deformable path segment comprises a similarity transform constraint (e.g., one or more parameters for applying a nearest similarity transform that maintains approximate shape, radius of curvature, angle, etc.). In yet another example, a transformation constraint for a fixed path segment comprises a fixed constraint (e.g., one or more parameters for preventing modifications or transformations). Other examples of transformation constraints include a continuity constraint, such as C1 smoothness continuity (e.g., curvature with $0^{th}$ and $1^{st}$ derivatives being continuous) or G1 curvature continuity (e.g., curvature sharing a common tangent direction at a joint). In certain implementations, transformation constraints are based on a slope (e.g., rise over run) of one or more path segments. For instance, a transformation constraint can include a slope threshold (e.g., a specific slope of y/x, or a range of permitted slopes).

As also used herein, the term "mesh" refers to a collection of polygons corresponding to a region within a digital image. In particular, in one or more embodiments, a mesh includes a collection of polygons consisting of vertices, edges, and areas (e.g., areas bounded by the vertices and edges) that correspond to the shape of an object portrayed within a digital image. For example, in some instances, a mesh refers to a collection of polygons that correspond to an edge portrayed in a digital image, an active region, and/or an influenced region portrayed in the digital image. In some cases, a mesh consists of triangles. In some instances, a mesh consists of quadrilaterals. In some implementations, a mesh consists of a combination of triangles, quadrilaterals, and/or polygons having additional sides. The part-level transformation system can modify pixels of a digital image by detecting changes to a corresponding mesh and mapping pixels from the original mesh to the modified mesh.

As also used herein, the term "anchor point" refers to a point on at least one path segment of a boundary vector path. In particular embodiments, an anchor point includes a junction (e.g., an intersection or joint) of two or more path segments. In other embodiments, an anchor point corresponds to an end of a path segment. Additionally or alternatively, an anchor point corresponds to certain points along a path segment, such as a halfway point, a quarter-way point, etc. In one example, an anchor point includes an intersection anchor point (e.g., an anchor point where an active region joins or connects to an influenced region). As another example, an anchor point includes a corner anchor point (e.g., an anchor point that joins or connects path segments that satisfy a threshold segment length or a threshold curvature deviation).

As used herein, the term "threshold segment length" refers to a length of a path segment. In particular embodiments, a threshold segment length includes a minimum length (or range length) of a path segment contiguous with another path segment of a same type (e.g., active path segment, deformable path segment, or fixed path segment). Similarly, as used herein, the term "threshold curvature deviation" refers to a change in curvature. In particular embodiments, a threshold curvature deviation includes a minimum curvature deviation (or range of curvature deviation) between two or more path segments at an anchor point. For example, a threshold curvature deviation may include an angle (or range of angles), a slope differential, etc. as measured between two path segments at an anchor point.

In addition, as used herein, the term "transformation handle" refers to an interactive element for modifying a subpart of an object. In particular embodiments, a transformation handle includes an interactive, visual element displayed over a digital image for modification of one or more active path segments. For example, in some implementations, a transformation handle includes a visual element, such as a visual representation of a directional slider, displayed over an active path segment or an active region. In response to user interaction with the transformation handle, the part-level transformation system can translate an active path segment and deform a deformable path segment.

Relatedly, as used herein, the term "translation data" refers to information or data corresponding to a user interaction with a transformation handle. For example, translation data comprises a drag/swipe speed, direction, etc. Similarly, the term "translation line" refers to a direction or path along which one or more active path segments travel (or are permitted to travel). For example, using a transformation handle, a user can translate an active path segment along a translation line that satisfies one or more transformation constraints based on slope.

As used herein the term "segmentation" can include an indication of a plurality of pixels portraying one or more objects. For example, a segmentation can include a segmentation boundary (e.g., a boundary line or curve indicating an edge of one or more objects) or a binary segmentation mask (e.g., a selection that definitively includes a first set of pixels and definitively excludes a second set of pixels as corresponding to an object). In another example, an object segmentation can include a probability map (e.g., a representation of a digital image that indicates, for each pixel, a likelihood of being included with or excluded from a segmentation). In yet another example, a segmentation can include a boundary edge description. Generating an object segmentation is sometimes referred to as "selecting" or "segmenting" a target object (e.g., identifying pixels that represent an object of interest).

As used herein, the term "shape-aware transformation solver" refers to one or more algorithms for modifying a subpart of an object. In particular embodiments, a shape-aware transformation solver comprises one or more algorithms for processing transformation constraints and translation data to modify a subpart in response to user interaction with a transformation handle. One or more examples of a shape-aware transformation solver are described by Kaufman et al. in U.S. patent application Ser. No. 16/856,269, entitled SHAPE AWARE TRANSFORMATION, hereafter "Kaufman," the contents of which are expressly incorporated herein by reference.

As also used herein, the term "neural network" refers to/includes a machine learning model that can be tuned (e.g., trained) based on inputs to approximate unknown functions. In particular embodiments, a neural network includes a model of interconnected neurons arranged in layers that communicate and learn to approximate complex functions and generate outputs based on a plurality of inputs provided to the model. For instance, a neural network includes one or more machine learning algorithms. In particular, a neural network can include deep convolutional neural networks (i.e., "CNNs"), fully convolutional neural networks (i.e., "FCNs"), or recurrent neural networks ("RNNs") such as long short-term memory neural networks ("LSTMs"). In other words, a neural network is an algorithm that implements deep learning techniques, e.g., machine learning that utilizes a set of algorithms to attempt to model high-level abstractions in data.

As used herein, the term "digital image" refers to a digital visual representation (e.g., an image composed of digital data). In particular embodiments, a digital image refers to a digital file that is made of digital image data and can be displayed via a user interface. For example, in one or more embodiments, a digital image includes a digital photo, a digital rendering (e.g., a scan) of a photograph or other document, or a frame of a digital video. In some implementations, a digital image includes a digitally generated drawing, chart, map, graph, logo, icon, glyph, etc. In certain embodiments, a digital image comprises a raster image.

Additional detail will now be provided regarding the part-level transformation system in relation to illustrative figures portraying example embodiments and implementations of the part-level transformation system. For example, FIG. 1 illustrates a computing system environment (or "environment") 100 for implementing a part-level transformation system 106 in accordance with one or more embodiments. As shown in FIG. 1, the environment 100 includes server(s) 102, a client device 108, and a network 112. Each of the components of the environment 100 communicate (or are at least configured to communicate) via the network 112, and the network 112 may be any suitable network over which computing devices can communicate. Example networks are discussed in more detail below in relation to FIG. 11.

As further illustrated in FIG. 1, the environment 100 includes the server(s) 102. In some embodiments, the server(s) 102 comprises a content server and/or a data collection server. Additionally or alternatively, the server(s) 102 comprise an application server, a communication server, a web-hosting server, a social networking server, or a digital content management server.

Moreover, as shown in FIG. 1, the server(s) 102 implement an image editing system 104. In one or more embodiments, the image editing system 104 provides functionality by which client device 108 generates, edits, manages, and/or stores digital images. For example, in some instances, the client device 108 sends a digital image to the image editing system 104 hosted on the server(s) 102 via the network 112. The image editing system 104 then provides a variety of options that the client device 108 may use to edit the digital image, store the digital image, and subsequently search for, access, and view the digital image.

The part-level transformation system 106 can efficiently modify a subpart of an object portrayed in a digital image. To illustrate, in one or more embodiments, the part-level transformation system 106 identifies an active region and an influenced region proximate to the active region within the subpart of the object portrayed in the digital image. In certain embodiments, the part-level transformation system 106 generates a boundary vector path defining a mesh for the active region and the influenced region. In turn, the part-level transformation system 106 determines one or more transformation constraints for the boundary vector path. In some embodiments, the part-level transformation system 106 modifies the subpart of the object by modifying the boundary vector path and the mesh corresponding to the active region and the influenced region in accordance with the one or more transformation constraints.

As shown in FIG. 1, the environment 100 includes the client device 108. The client device 108 can include one of a variety of computing devices, including a smartphone, tablet, smart television, desktop computer, laptop computer, virtual reality device, augmented reality device, or other computing device as described in relation to FIG. 11. Although FIG. 1 illustrates a single client device 108, in some embodiments the environment 100 includes multiple client devices 108. In these or other embodiments, the client device 108 further communicates with the server(s) 102 via the network 112. For example, the client device 108 receives user input and provides information pertaining to accessing, viewing, modifying, and/or interacting with a rendered digital image to the server(s) 102.

As shown, the client device 108 includes a part-level transformation client system 110. In particular embodiments, the part-level transformation client system 110 comprises a web application, a native application installed on the client device 108 (e.g., a mobile application, a desktop application, etc.), or a cloud-based application where part of the functionality is performed by the server(s) 102. In some embodiments, the part-level transformation client system 110 presents or displays information to a user associated with the client device 108, including digital images rendered utilizing part-level editing as provided in this disclosure.

In additional or alternative embodiments, the part-level transformation client system 110 represents and/or provides the same or similar functionality as described herein in connection with the part-level transformation system 106. In some implementations, the part-level transformation client system 110 supports the part-level transformation system 106 on the server(s) 102. Indeed, in one or more embodiments, the client device 108 includes all, or a portion of, the part-level transformation system 106.

In some embodiments, though not illustrated in FIG. 1, the environment 100 has a different arrangement of components and/or has a different number or set of components altogether. For example, in certain embodiments, the environment 100 includes a third-party server (e.g., for storing digital images or other data). As another example, the client device 108 communicates directly with the server(s) 102, bypassing the network 112.

Figure 2A:
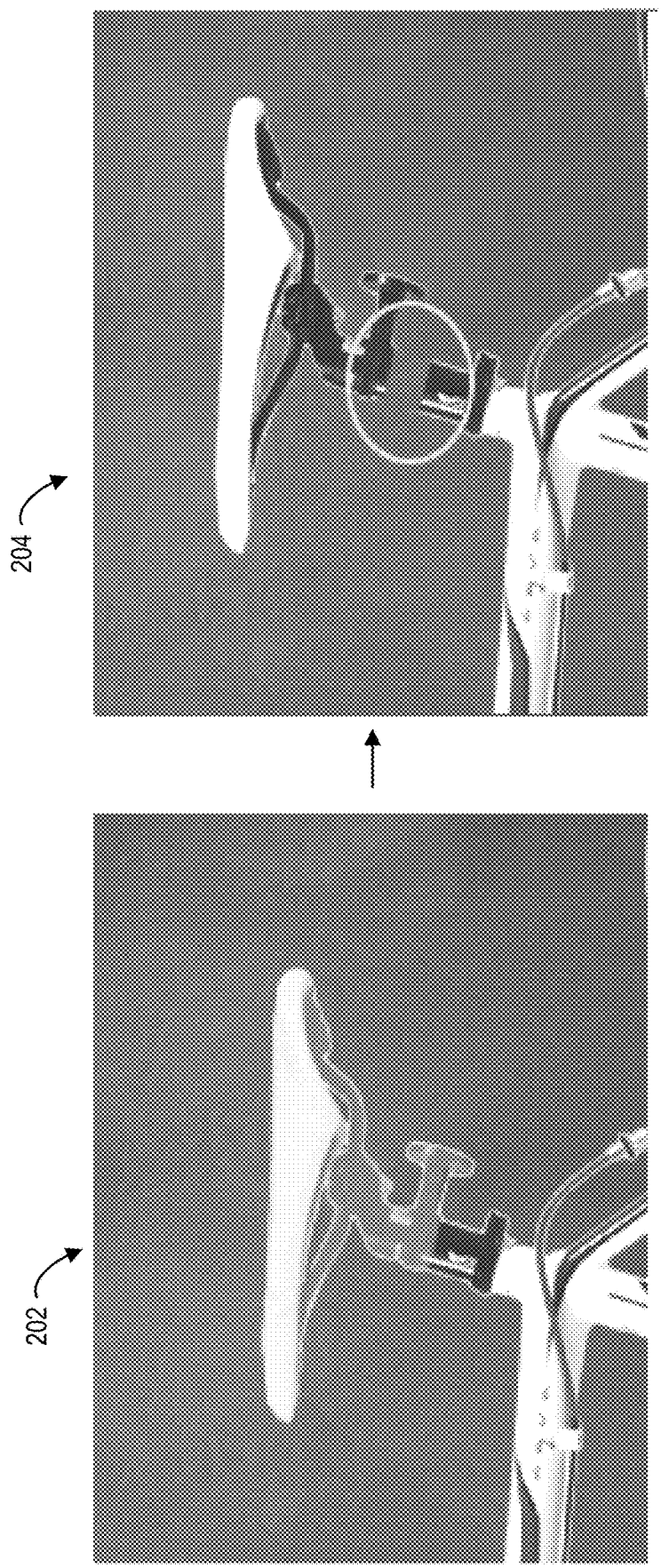
FIG. 2A illustrates prior art methods of conventional digital image editing systems attempting to perform part-level editing.
Figure 2B:
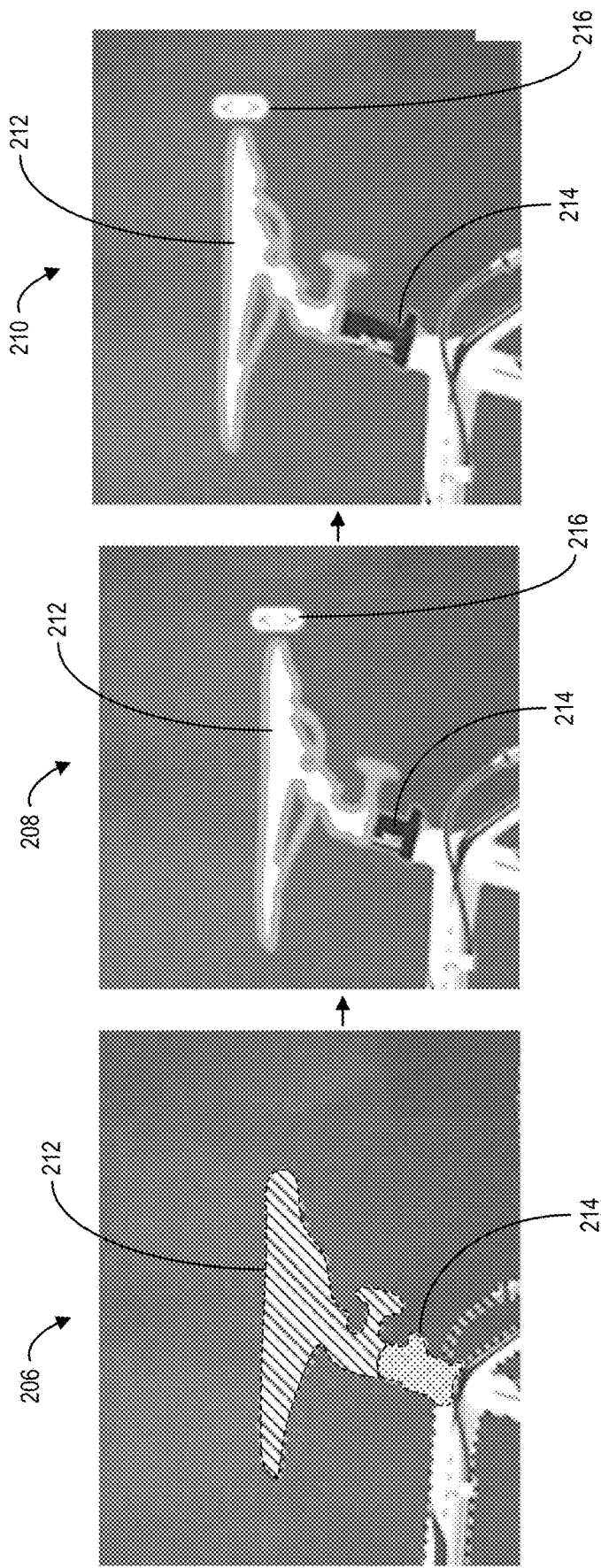
FIG. 2B illustrates a part-level transformation system rendering a digital image with a modified subpart in accordance with one or more embodiments.

As mentioned above, the part-level transformation system can provide more efficient and accurate part-level editing within objects portrayed in digital images. As an example, FIG. 2A illustrates an example prior art method of one or more conventional digital image editing systems attempting to perform part-level editing. In contrast, FIG. 2B illustrates the part-level transformation system 106 rendering a digital image with a modified subpart in accordance with one or more embodiments. In particular, the below description of FIGS. 2A-2B outlines one of many example scenarios in which the part-level transformation system 106 can exhibit the computational performance improvements disclosed in this application.

As shown in an act 202 of FIG. 2A, some conventional digital image editing systems edit digital images by using a plurality of tools and user interactions to select a portion of an object. Based on the selection, conventional digital image editing systems can create a new layer with the selection. In turn, certain conventional digital image editing systems receive user input to move or translate the selected portion of the object. However, this has the effect of erasing an area of the digital image under the selection. Accordingly, to avoid a digital image with a large hole, conventional systems can utilize additional tools and user interactions to modify the digital image.

For example, as illustrated in FIG. 2A at an act 204, some conventional digital image editing systems can move a selection in a separate layer (e.g., so as to extend the height of the seat). However, as shown, moving the selection introduces a gap (as circled) in the seat post underneath the modified (e.g., moved) selection. Moreover, as described previously, filling the gap using existing tools requires an inordinate amount of user interactions to modify specific portions of an object. That is, typical user interface operations of such conventional digital image editing systems involve excessive trial and error to fill holes plus match lighting, reflection and texture in modified areas, correct color distortions in filled areas, and rectify joint/connection errors. Thus, conventional digital image editing systems fail to efficiently and accurately capture certain realistic details and effects within a modified digital image. Indeed, as shown in FIG. 2A, even after using an algorithm to fill the gap-region, the digital image still includes a discontinuity between portions of the object portrayed in the digital image.

In contrast, FIG. 2B shows the part-level transformation system 106 performing enhanced part-level editing based on intuitive modification of one or more path segments in a boundary vector path according to one or more transformation constraints. In particular, at an act 206, the part-level transformation system 106 identifies an active region 212 and an influenced region 214. For example, the part-level transformation system 106 identifies one or more user interactions to indicate discrete selections of subpart regions within a segmentation. In this case, the part-level transformation system 106 identifies a first user interaction to select the active region 212 as comprising the seat saddle, a knob-tightener, and a portion of a seat post. Likewise, the part-level transformation system 106 identifies a second user interaction to select the influenced region 214 as comprising a remaining portion of the seat post underneath the active region 212.

At an act 208, the part-level transformation system 106 provides a transformation handle 216 for display. For example, the part-level transformation system 106 provides the transformation handle 216 for display in response to detecting a user interaction with the active region 212 (e.g., an interior portion of the active region 212 and/or a corresponding active path segment). As depicted in FIG. 2B, the transformation handle 216 comprises a directional slider for translating the active region 212 in a desired direction (e.g., along a translation line coaxial with a central axis of the seat post).

In particular embodiments, the act 208 comprises determining and applying transformation constraints. For example, the part-level transformation system 106 determines transformation constraints between the active region 212 and the influenced region 214. To do so, certain implementations of the part-level transformation system 106 impose transformation constraints specific to path segments that correspond to the active region 212 and the influenced region 214 in order to preserve different properties and geometrical continuities. With such transformation constraints enforced, the part-level transformation system 106 can accurately and realistically translate the active region 212 and transform the influenced region 214 in response to user interaction with the transformation handle 216.

Indeed, as shown at an act 210, the part-level transformation system 106 translates the active region 212 in response to a user interaction to drag or slide the transformation handle 216 in an upwards direction. As the part-level transformation system 106 translates the active region 212, the part-level transformation system 106 simultaneously extends or lengthens the influenced region 214 such that the seat post under the seat saddle comprises an overall extended length. In this manner, the part-level transformation system 106 can efficiently and accurately modify a subpart to generate a realistic, modified digital image.

Figure 3:
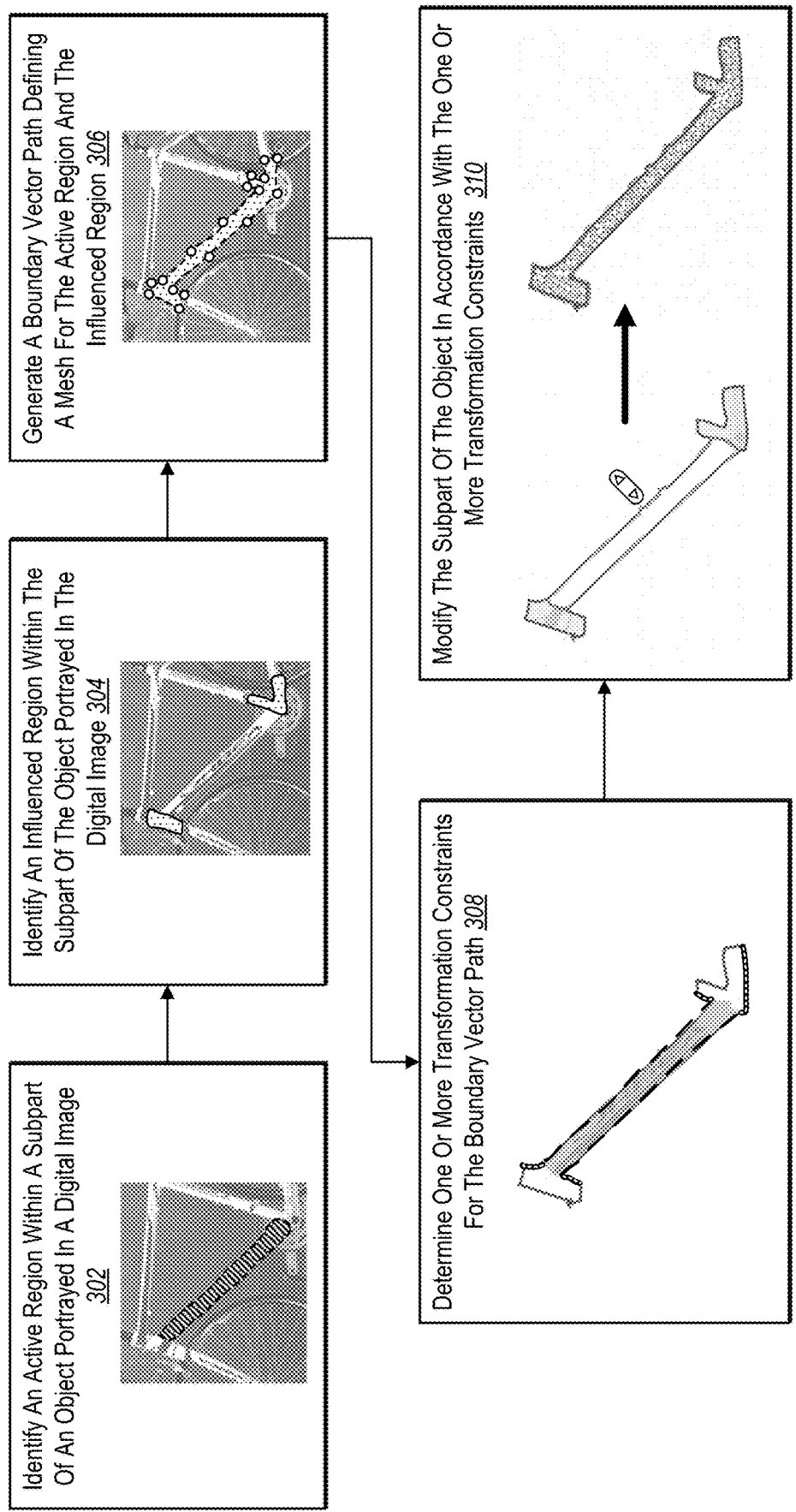
FIG. 3 illustrates a part-level transformation system modifying a subpart of an object portrayed in a digital image in accordance with one or more embodiments.

As mentioned above, the part-level transformation system 106 can identify specific regions within a subpart of an object and generate a corresponding boundary vector path. Certain embodiments of the part-level transformation system 106 then utilize transformation constraints for the boundary vector path to modify the subpart in an intuitive, accurate manner. FIG. 3 illustrates the part-level transformation system 106 modifying a subpart of an object in accordance with one or more embodiments.

As shown, at an act 302, the part-level transformation system 106 identifies an active region (e.g., a bike frame down tube) within a subpart of an object portrayed in a digital image. In some embodiments, the part-level transformation system 106 uses one of a variety of different methods to identify an active region. To illustrate, in certain implementations, the part-level transformation system 106 automatically determines (e.g., with little or no user interaction) a plurality of subparts and corresponding active regions within the plurality of subparts. For example, the part-level transformation system 106 uses one or more of edge detection algorithms, segmentation models, neural networks, etc. to process a digital image and predict one or more candidate subparts and active regions. In such an example, the part-level transformation system 106 may present the one or more candidate subparts and active regions for user selection, validation, and/or augmentation.

In other embodiments, the part-level transformation system 106 determines an active region within a subpart utilizing a more interactive approach. For example, in some embodiments, the part-level transformation system 106 uses one or more user interactions with an object (e.g., a segmented object) to identify the active region of a subpart. To illustrate, the part-level transformation system 106 detects a user interaction with one or more digital selection tools that, when applied, indicate pixels or groups of pixels of the digital image corresponding to the active region. For instance, the part-level transformation system 106 identifies the active region based on identifying an approximate outline of the active region (e.g., via a digital lasso selection tool). In another instance, the part-level transformation system 106 identifies the active region based on identifying a selection of pixels corresponding to a covered, filled, or painted area of the object (e.g., from a digital paint tool, fill tool, etc.). Still, in other examples, the part-level transformation system 106 identifies the active region based on one or more user indicators (e.g., positive clicks, negative clicks, boundary indicators, etc.) that indicate portion(s) of the object as corresponding to (and/or not corresponding to) the active region.

At an act 304, the part-level transformation system 106 identifies an influenced region within the subpart of the object portrayed in the digital image (e.g., connecting portions to a bike frame down tube). As with the act 302, certain embodiments of the part-level transformation system 106 utilize one of a variety of different methods to identify an influenced region. In one example, the part-level transformation system 106 automatically determines the influenced region. For instance, the part-level transformation system 106 leverages one or more of edge detection algorithms, segmentation models, neural networks, etc. to process a digital image and predict influenced regions. In this instance, the part-level transformation system 106 predicts one or more influenced regions corresponding to respective candidate active regions. In other instances, the part-level transformation system 106 predicts one or more influenced regions in response to identifying a single user selection of an active region. In such examples, the part-level transformation system 106 may present the one or more predicted influenced regions for user selection, validation, and/or augmentation.

In particular embodiments, the part-level transformation system 106 identifies the influenced region within a subpart utilizing a more interactive approach. For example, the part-level transformation system 106 uses one or more user interactions with an object (e.g., in a same or similar manner as described above in relation to the act 302). To illustrate, the part-level transformation system 106 identifies the influenced region based on identifying a selection of pixels corresponding to a covered, filled, or painted area of the object (e.g., from a digital paint tool, fill tool, etc.).

In certain implementations, the one or more user interactions indicating the influenced region differ from the one or more user interactions indicating the active region at the act 302 (albeit not required). For example, in one or more embodiments, the part-level transformation system 106 identifies the influenced region using a specific user interface tool or user interface selection mode designated only for selecting the influenced region. To illustrate the part-level transformation system 106 identifies the influenced region using the lasso tool (in contrast to the paint tool for indicating the active region). In another example, the part-level transformation system 106 identifies the influenced region using a specific user indicator (e.g., a yellow paint color for the influenced region in contrast to a blue paint color for the active region).

Figure 4:
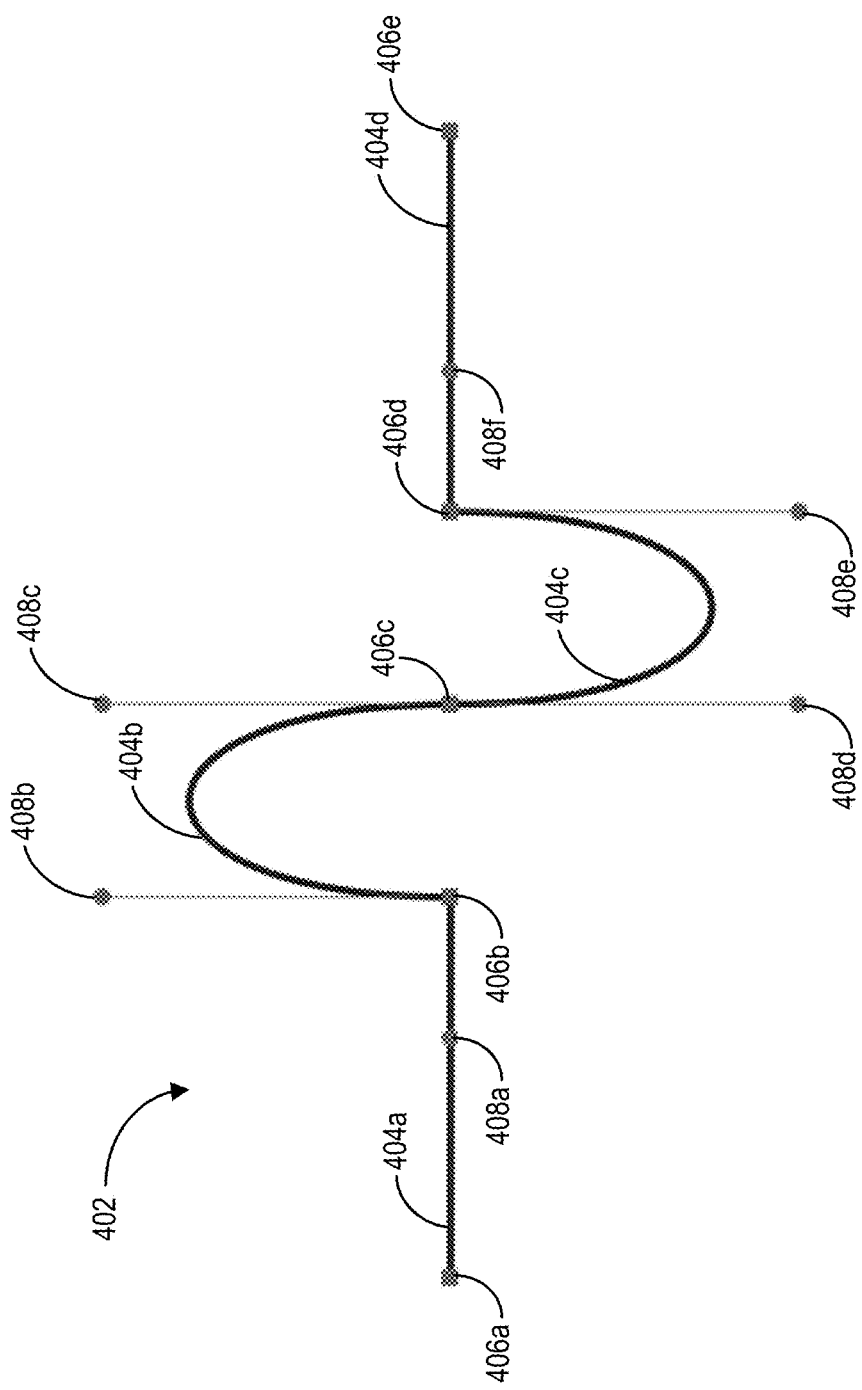
FIG. 4 illustrates a part-level transformation system determining a boundary vector path in accordance with one or more embodiments.

At an act 306, the part-level transformation system 106 generates a boundary vector path defining a mesh for the active region and the influenced region. In some embodiments, the part-level transformation system 106 generates the boundary vector path in a variety of ways. FIG. 4 below provides additional detail regarding generating boundary vector paths in accordance with one or more embodiments.

As one example though, the part-level transformation system 106 generates the boundary vector path by utilizing a segmentation of the object. For instance, the part-level transformation system 106 determines portions of an object segmentation that correspond to the active region and the influenced region. Using these portions of the object segmentation, one or more embodiments of the part-level transformation system 106 determine corresponding edges of the subpart for a boundary vector path to follow.

As another example, the part-level transformation system 106 generates the boundary vector path by determining an outline around the union of the active region and the influenced region of the subpart. In this example, the part-level transformation system 106 may utilize edge detection algorithms or pixel gradient analyses to determine a pixel path. Along this pixel path, the part-level transformation system 106 generates a series of lines or curves (e.g., path segments) to create a vectorized perimeter border of the subpart. In turn, the part-level transformation system 106 generates anchor points at end points, junctions, or other locations for the path segments.

As mentioned, in one or more embodiments, the part-level transformation system 106 determines a mesh that corresponds to the boundary vector path. For instance, the part-level transformation system 106 determines a pixel-mesh mapping that indicates how pixels of the digital image map to a mesh. In these or other embodiments, the part-level transformation system 106 generates the boundary vector path by determining which triangles (or other shapes) composing the mesh correspond to the pixels identified within the active region and the influenced region. In turn, certain implementations of the part-level transformation system 106 generate the boundary vector path by creating path segments along an outermost portion of the identified mesh triangles corresponding to the active region and the influenced region.

Figure 6:
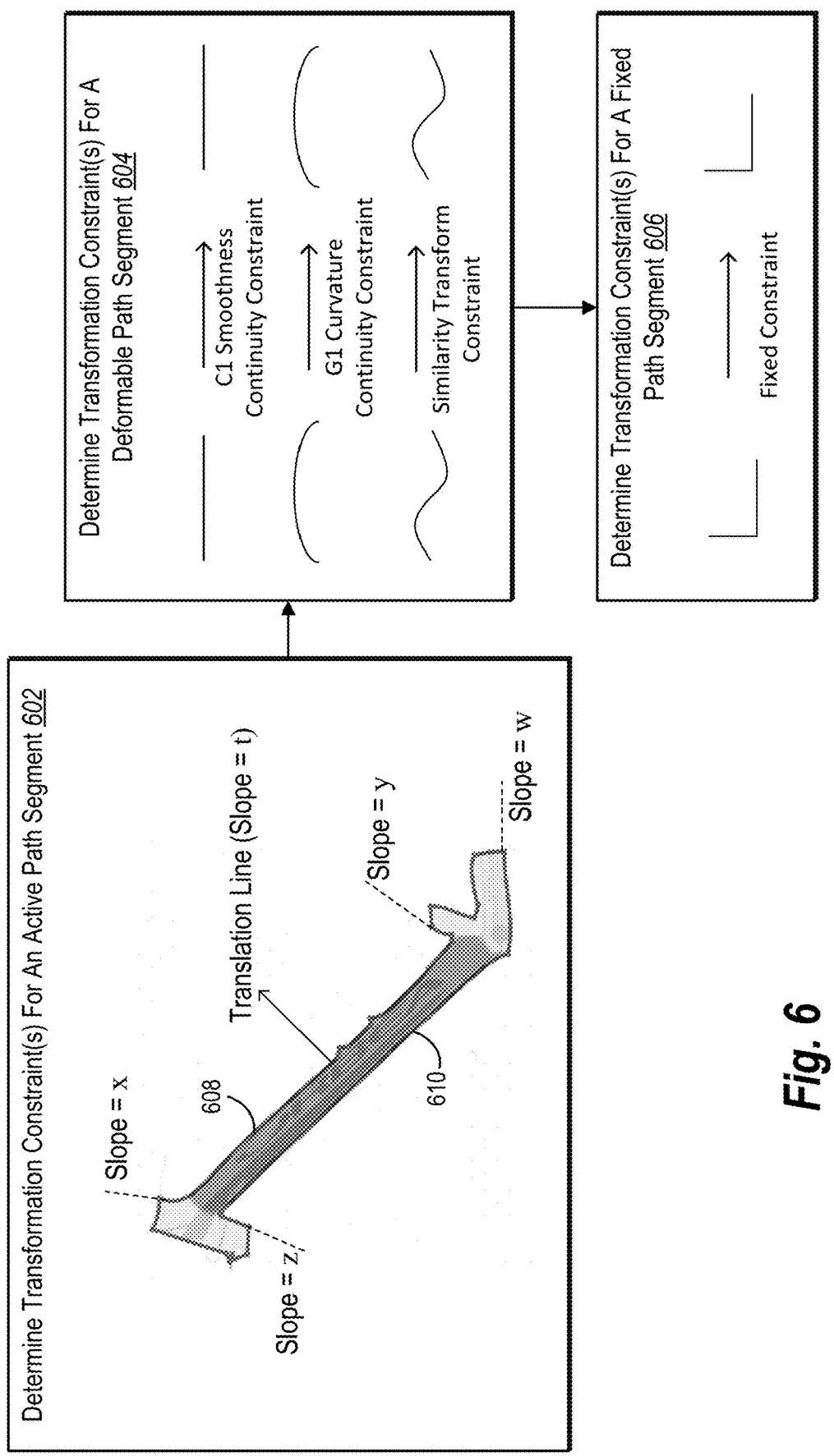
FIG. 6 illustrates a part-level transformation system determining transformation constraints for path segments in accordance with one or more embodiments.

At an act 308, the part-level transformation system 106 determines one or more transformation constraints for the boundary vector path. The one or more transformation constraints control how portions of the boundary vector path move or do not move when modifying the subpart. FIG. 6, described below, provides additional detail regarding determining transformation constraints for the boundary vector path in accordance with one or more embodiments. In general though, certain embodiments of the part-level transformation system 106 determine a respective transformation constraint for each portion of the boundary vector path (e.g., each path segment and/or type of path segment). For example, the part-level transformation system 106 determines a first transformation constraint for an active path segment, a second transformation constraint for a deformable path segment, and a third transformation constraint for a fixed path segment.

At an act 310, the part-level transformation system 106 modifies the subpart of the object in accordance with the one or more transformation constraints. In particular embodiments, the part-level transformation system 106 uses the one or more transformation constraints when modifying the subpart in response to user interaction with the subpart. For example, the part-level transformation system 106 detects a user interaction with an active region, a particular active path segment, or an individual anchor point. Responsive to the user interaction, certain embodiments of the part-level transformation system 106 correspondingly morph path segment(s) corresponding to the influenced region by warping, stretching, or compressing such path segments in a manner that conforms with the one or more transformation constraints. Additionally, one or more embodiments of the part-level transformation system 106 correspondingly move path segment(s) corresponding to the active region by translating or rotating such path segments based on the one or more transformation constraints.

In some embodiments, the part-level transformation system 106 uses a shape-aware transform solver to modify a subpart at runtime. In particular embodiments, the part-level transformation system 106 uses the shape-aware transform solver to process one or more of transformation constraint(s), one or more path segments of the boundary vector path, or user input data (e.g., translation data) corresponding to a user interaction with the subpart. For instance, the part-level transformation system 106 uses the shape-aware transform solver to drive live, interactive manipulations with transformation handles by alternating steps of constrained, Sobolev-preconditioned gradient descent with ordered projections onto transformation constraints to predict real-time (or near real-time) solutions as described in Kaufman. That is, the shape-aware transform solver can determine path segment solutions by satisfying the various transformation constraints based on associated priorities and in a manner that avoids some or all issues from locking and infeasibility (also described in Kaufman).

Additionally, at the act 310, certain embodiments of the part-level transformation system 106 modify the subpart by updating a mesh of the subpart. To do so, in some embodiments, the part-level transformation system 106 utilizes a pixel-mesh mapping that indicates how pixels of the digital image map to polygons in an original mesh of the subpart. In response to mesh changes, one or more embodiments of the part-level transformation system 106 apply the pixel-mesh mapping to correspondingly update pixels. For instance, the part-level transformation system 106 generates a modified mesh of a subpart in response to translating an active path segment and morphing a deformable path segment. Certain embodiments of the part-level transformation system 106 then use a pixel-mesh mapping to move pixels to updated locations that correspond to (e.g., map to) adjusted polygons in the modified mesh. To illustrate, the act 310 of FIG. 3 depicts the part-level transformation system 106 updating the mesh of the subpart such that the subpart is now thinner in response to a user interaction to translate one or more active path segments for the bike frame down tube closer together.

In these or other embodiments, the act 310 comprises the part-level transformation system 106 utilizing a variety of different mesh deformation techniques and/or content-aware hole filling methods. Example mesh deformation techniques are described in U.S. Pat. No. 10,140,764, entitled GENERATING EFFICIENT, STYLIZED MESH DEFORMATIONS USING A PLURALITY OF INPUT MESHES, the contents of which are expressly incorporated herein by reference. Additionally, example content-aware hole-filling methods are described in U.S. patent application Ser. No. 17/202,019, entitled GENERATING MODIFIED DIGITAL IMAGES USING DEEP VISUAL GUIDED PATCH MATCH MODELS FOR IMAGE INPAINTING, the contents of which are expressly incorporated herein by reference.

As discussed above, in one or more embodiments, the part-level transformation system 106 generates a boundary vector path to allow intuitive modifications of certain regions of subparts (e.g., an active region). FIG. 4 illustrates the part-level transformation system 106 determining a boundary vector path in accordance with one or more embodiments. In particular, FIG. 4 depicts the part-level transformation system 106 generating a boundary vector path that corresponds to a particular edge (or perimeter portion) of a subpart.

Specifically, as shown in FIG. 4, the part-level transformation system 106 determines the boundary vector path 402 by generating a plurality of path segments 404a-404d. Additionally, the part-level transformation system 106 generates a plurality of anchor points 406a-406e corresponding to the ends of the path segments 404a-404d. However, in other embodiments, the part-level transformation system 106 generate anchor points at myriad different locations (e.g., at certain interval lengths of a path segment, at midway points, etc.). Moreover, anchor points can include junctions of multiple path segments, such as two, three, or more different path segments.

Further, as shown, the part-level transformation system 106 generates a plurality of anchor handles 408a-408f. In some embodiments, the part-level transformation system 106 generates an anchor handle for each anchor point of a boundary vector path. In some instances, the part-level transformation system 106 generates an anchor handle for each subset (or pair) of the anchor points of the boundary vector path. In at least one implementation, the part-level transformation system 106 generates multiple anchor handles for a corresponding anchor point. To illustrate, in one or more embodiments, the part-level transformation system 106 generates the anchor handles 408a, 408c, and 408e to modify a position of the anchor points 406b, 406c, and 406d, respectively (e.g., to modify the position of the path segments associated with the anchor points 406b, 406c, and 406d). Further, the part-level transformation system 106 generates the anchor handles 408b, 408d, and 408f to modify an orientation of the anchor points 406b, 406c, and 406d, respectively (e.g., to modify the orientation of the path segments associated with the anchor points 406b, 406c, and 406d).

Though FIG. 4 illustrates the boundary vector path 402 having a particular path from one end to the other, it should be noted that the boundary vector path 402 is merely exemplary. Indeed, certain embodiments of the part-level transformation system 106 generate a boundary vector path based on the perimeter edge of an object portrayed in a digital image. To illustrate, the part-level transformation system 106 generates the path segments of a boundary vector path so that the path from a first path segment of the boundary vector path to a final path segment of the boundary vector path corresponds to (e.g., matches or approximates) a detected edge of an object. Indeed, as will be discussed in more detail, in one or more embodiments, the part-level transformation system 106 generates the segments of the boundary vector path so that the path corresponds to a path indicated by pixels associated with an edge, such as pixels located in the center of the edge or pixels corresponding to an outline of the edge.

In one or more implementations, the part-level transformation system 106 utilizes a segmentation of the object that indicates object edges to generate the path segments of a boundary vector path. For instance, the part-level transformation system 106 generates path segments of the boundary vector path 402 along an object segmentation that borders an active region and an influenced region of a subpart. To illustrate, the part-level transformation system 106 generates path segments of the boundary vector path 402 by applying a series of straight lines or curves that approximately match or follow the segmentation at object edges corresponding to the active region and the influenced region.

Additionally or alternatively, in some embodiments, the part-level transformation system 106 utilizes an edge detection algorithm to determine edge data associated with an edge of a subpart of an object. Example types of edge detection algorithms may include search-based edge detection algorithms (e.g., using first order derivatives and local maxima) or zero-crossing edge detection algorithms (e.g., that search for zero-crossings in second-order derivative expressions). Based on the edge data, certain implementations of the part-level transformation system 106 generate the boundary vector path 402.

Moreover, it can be appreciated that the part-level transformation system can iterate one or more elements of the foregoing process to generate the boundary vector path 402 (e.g., until outlining an entire perimeter of a subpart of an object). To illustrate, the part-level transformation system further generates additional portions of the boundary vector path 402 so as to generate an active path segment, a deformable path segment, and/or a fixed path segment around an active region and an influenced region of a subpart.

Figure 5A:
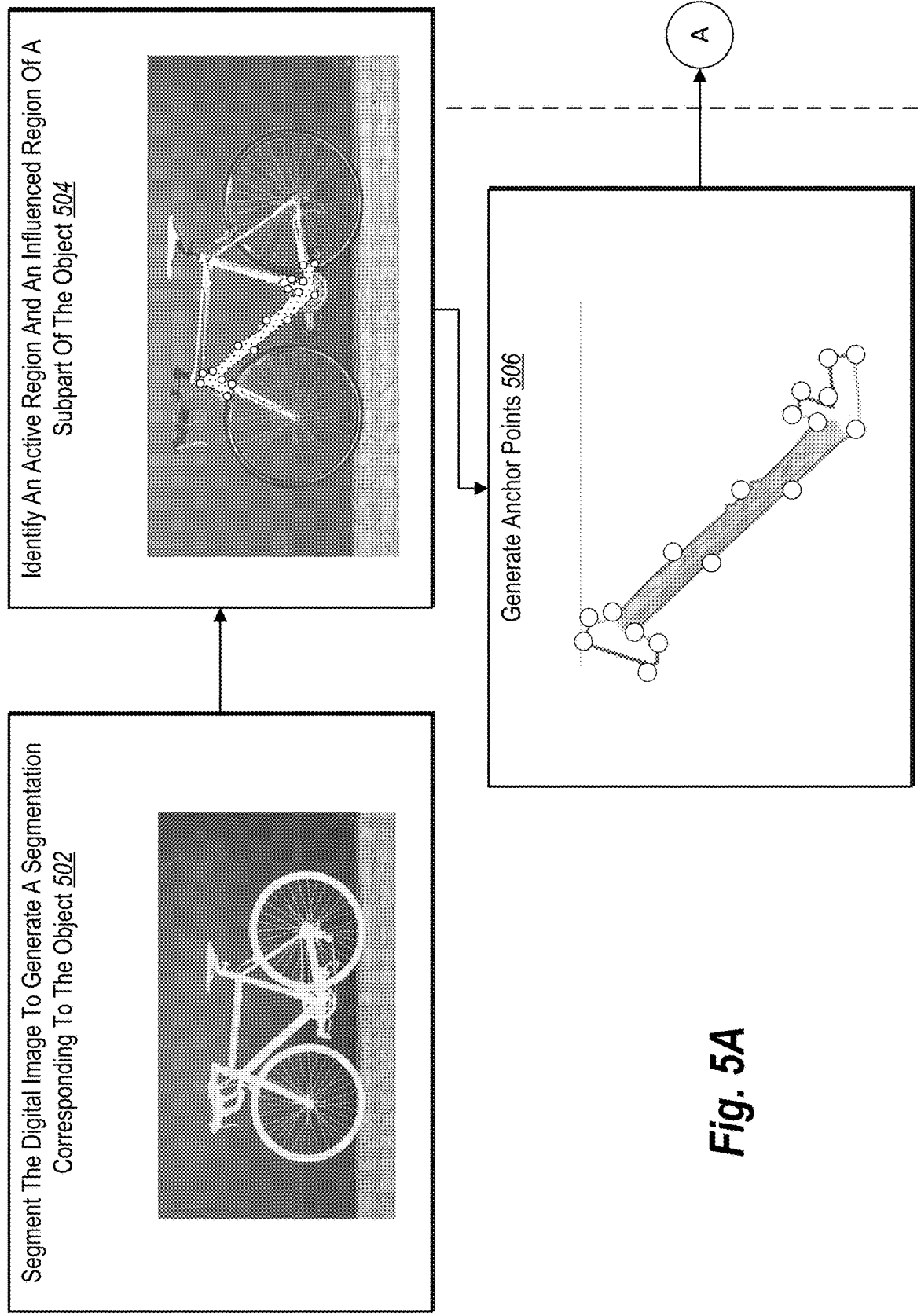
FIGS. 5A-5B illustrate a part-level transformation system determining an active path segment, a deformable path segment, and a fixed path segment in accordance with one or more embodiments.
Figure 5B:
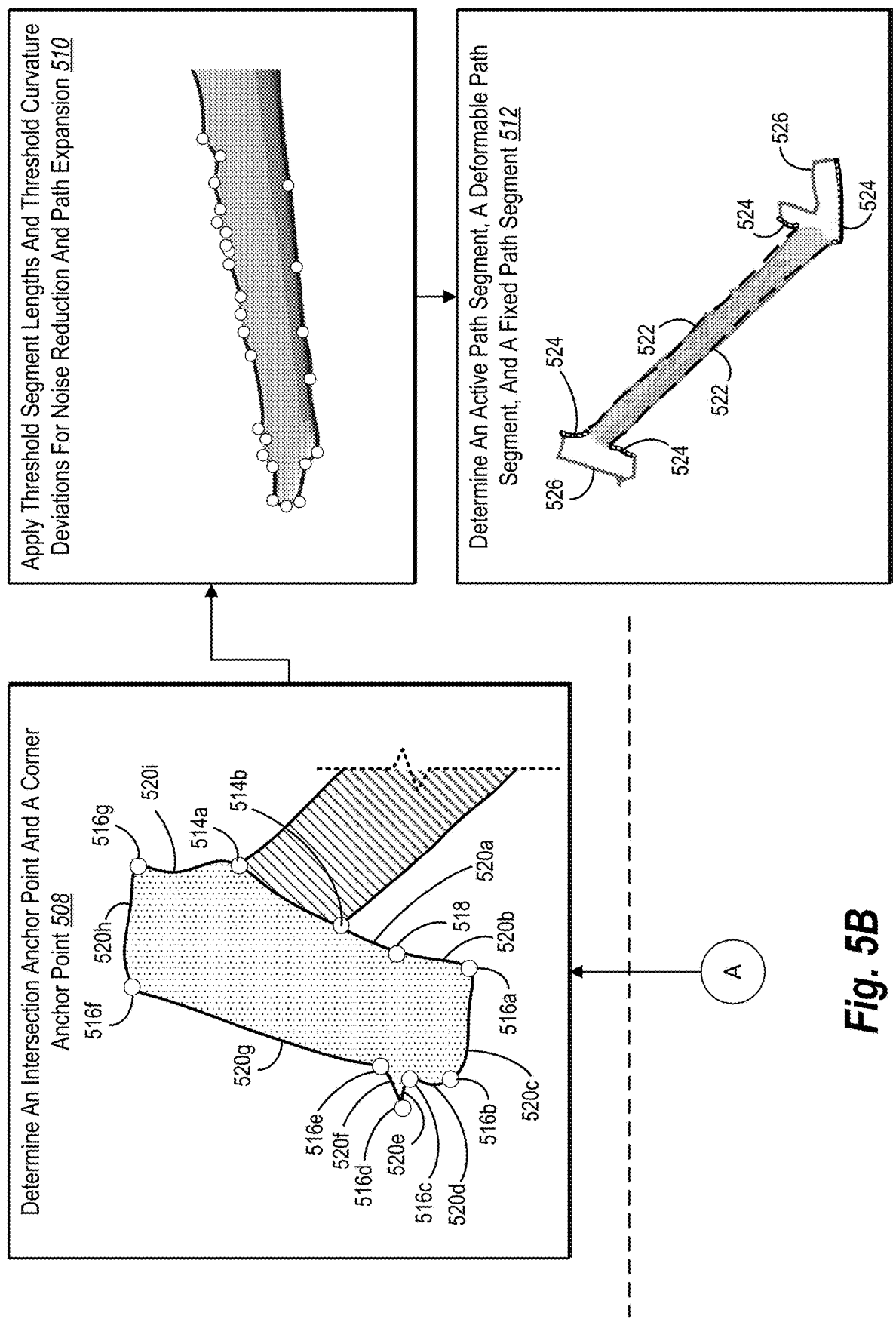

As mentioned above, the part-level transformation system 106 can apply specific transformation constraints on a path segment basis. Thus, in certain embodiments, the part-level transformation system 106 determines an active path segment, a deformable path segment, and a fixed path segment from various path segments. To determine specific path segments, particular implementations of the part-level transformation system 106 segment the digital image, identify active and influenced regions, generate anchor points, identify specific kinds of anchor points, and reduce segment path noise. FIGS. 5A-5B depict such an example. Indeed, FIGS. 5A-5B illustrate the part-level transformation system 106 determining an active path segment, a deformable path segment, and a fixed path segment in accordance with one or more embodiments.

At an act 502, the part-level transformation system 106 segments a digital image to generate a segmentation corresponding to an object (e.g., a bike) portrayed within the digital image. In particular embodiments, the part-level transformation system 106 generates the segmentation utilizing one or more automatic or semi-automatic selection methods. For example, in some embodiments, the part-level transformation system 106 utilizes an object segmentation neural network that automatically selects a salient object portrayed in the digital image (e.g., by utilizing a convolutional neural network as described in Pao et al. in U.S. patent application Ser. No. 15/967,928 filed on May 1, 2018, entitled ITERATIVELY APPLYING NEURAL NETWORKS TO AUTOMATICALLY IDENTIFY PIXELS OF SALIENT OBJECTS PORTRAYED IN DIGITAL IMAGES, the contents of which are expressly incorporated herein by reference). In additional or alternative embodiments, the part-level transformation system 106 utilizes a foreground/background segmentation algorithm.

Additionally or alternatively, the part-level transformation system 106 utilizes a salient content neural network to segment foreground and background pixels in a digital image (e.g., as described in U.S. patent application Ser. No. 15/799,395, filed on Oct. 31, 2017, entitled DEEP SALIENT CONTENT NEURAL NETWORKS FOR EFFICIENT DIGITAL OBJECT SEGMENTATION, the contents of which are expressly incorporated herein by reference).

In additional or alternative embodiments, the part-level transformation system 106 generates the segmentation corresponding to the object by utilizing one or more interactive approaches. For example, the part-level transformation system 106 generates a segmentation corresponding to the object in response to identifying object user indicators from user input with respect to specific portions of the digital image. To illustrate, the part-level transformation system 106 identifies one or more of positive user indicators, negative user indicators, edge clicks, bounding shapes, etc. based on a selection of a software tool and a corresponding set of clicks/haptic inputs with the selected software tool. As another example, the part-level transformation system 106 may identify a user input to select a lasso selection tool and trace a single loose boundary around an object portrayed in the digital image.

At an act 504, the part-level transformation system 106 identifies an active region and an influenced region of a subpart of the object. For example, as similarly described above in relation to FIG. 3, the part-level transformation system 106 identifies the active region and the influenced region by processing the segmentation corresponding to the object utilizing one or more of edge detection algorithms, segmentation models, neural networks, etc. As another example, the part-level transformation system 106 identifies the active region and the influenced region by identifying user inputs within the segmentation. For instance, the part-level transformation system 106 identifies, within the segmentation, pixels that correspond to digital selections, painted areas, user indicators, labels, digital tags, etc.

At an act 506, the part-level transformation system 106 generates anchor points for a boundary vector path that extends around a subpart. As discussed above in relation to FIG. 4, certain embodiments of the part-level transformation system 106 generate the anchor points at each end of a path segment. Additionally or alternatively, one or more embodiments of the part-level transformation system 106 generate anchor points at discrete locations along a boundary vector path (e.g., at different increments or locations).

In FIG. 5B at an act 508, the part-level transformation system 106 determines an intersection anchor point and a corner anchor point. In particular embodiments, the part-level transformation system 106 analyzes certain characteristics of anchor points and/or path segments to determine whether an anchor point constitutes an intersection anchor point (e.g., intersection anchor points 514a, 514b), a corner anchor point (e.g., corner anchor points 516a-516g), or a regular anchor point (e.g., anchor point 518).

For example, to identify an intersection anchor point, the part-level transformation system 106 searches for an anchor point along the boundary vector path where the active region and the influenced region join together. To illustrate, the part-level transformation system 106 queries one or more anchor points. Numerous types of queries may be applied. In one example query for a given anchor point, certain embodiments of the part-level transformation system 106 analyze path segments that correspond to the given anchor point. For instance, the part-level transformation system 106 determines the given anchor point is not an intersection anchor point when the anchor point is positioned between contiguous path segments that both outline portions of the active region (or the influenced region). In contrast, the part-level transformation system 106 determines the given anchor point is an intersection anchor point when the anchor point is positioned between contiguous path segments that outline portions for both the active region and the influenced region. That is, an intersection anchor point is where one path segment corresponding to the active region meets another path segment corresponding to the influenced region.

In some embodiments, an anchor point does not initially exist along the boundary vector path where the active region and the influenced region meet. These scenarios may arise in a variety of situations, such as when a single path segment of a boundary vector path extends along portions of both the active region and the influenced region. Accordingly, in some embodiments, the part-level transformation system 106 implements one or more additional or alternative acts or algorithms to query boundary vector path locations. This approach allows the part-level transformation system 106 to properly capture where the influenced region and the active region meet. Moreover, this approach allows the part-level transformation system 106 to correspondingly insert an intersection anchor point if an anchor point is not already generated at the identified location.

In one example act, the part-level transformation system 106 queries boundary vector path locations by inferring a virtual line (not illustrated) that separates the active region and the influenced region. In turn, the part-level transformation system 106 identifies an intersection between the virtual line and the boundary vector path as constituting a location for inserting an intersection anchor point.

In another example act, the part-level transformation system 106 queries boundary vector path locations by performing neighborhood pixel analyses along the boundary vector path. In each neighborhood pixel sample, the part-level transformation system 106 can determine whether the sampled pixels correspond to only the active region, only the influenced region, or both the active region and the influenced region. In this example, the part-level transformation system 106 may iteratively sample pixel neighborhoods along the boundary vector path (e.g., according to a distribution function, incremental pixel distance, etc.) until identifying a pixel neighborhood with pixels of both the active region and the influenced region. That is, certain implementations of the part-level transformation system 106 identify a location for inserting an intersection anchor point along a boundary vector path based on an adjacent neighborhood pixel sample of mixed pixels that corresponds to both the active region and the influenced region. By identifying or generation such intersection anchor points, the part-level transformation system can identify boundaries between active regions/active path segments and influenced regions/deformable path segments.

In addition to identifying intersection anchor points, certain embodiments of the part-level transformation system 106 identify corner anchor points. Corner anchor points can be utilized to identify boundaries and/or transitions between deformable path segments and fixed path segments. In other words, the part-level transformation system 106 can search for and/or generate corner anchors as natural hinge positions (where the object will deform on one side, but remain fixed on the other side).

The part-level transformation system 106 can identify and/or generate corner anchor points in a variety of ways. In some embodiments, the part-level transformation system 106 determines corner anchor points by analyzing relative angles between path segments within an influenced region. For example, the part-level transformation system 106 searches for anchor points within an influenced region that fall between contiguous path segments and that form a particular angle that satisfies a threshold angle or threshold range of angles (e.g., less than 150 degrees).

To illustrate an example, the part-level transformation system 106 can seek for a corner anchor point after determining the intersection anchor point 514b. In querying the anchor point 518, one or more embodiments of the part-level transformation system 106 determine the anchor point 518 is not a corner anchor point by analyzing the path segments 520a, 520b at the anchor point 518. For instance, the part-level transformation system 106 determines that the path segments 520a, 520b fail to satisfy a threshold angle of 150 degrees based on determining that the path segments 520a, 520b form an angle of about 180 degrees. In turn, one or more embodiments of the part-level transformation system 106 determine the anchor point 518 is not a corner anchor point and therefore move to the next anchor point for analysis.

Specifically, the part-level transformation system 106 can determine the corner anchor point 516a is indeed a corner anchor point by analyzing an angle formed between the path segments 520b, 520c. Based on the angle analysis, the part-level transformation system 106 determines the angle is approximately 90 degrees and therefore satisfies the threshold angle of 150 degrees. Accordingly, the part-level transformation system 106 determines that the corner anchor point 516a is a corner anchor point.

As another example, the part-level transformation system 106 analyzes curvature along path segments (e.g., intra-path-segment curvature) to determine or generate corner anchor points. As similarly described above for intersection anchor points, this approach allows the part-level transformation system 106 to potentially capture corners of the subpart that do not coincide with existing anchor points of a boundary vector path. For instance, the part-level transformation system 106 may analyze the curvature of entire path segments (not just angles formed at anchor points) in order to determine corners formed along a singular path segment between anchor points. In this manner, the part-level transformation system 106 can determine locations for inserting corner anchor points if initially omitted.

In some embodiments, the part-level transformation system 106 uses a sequential approach to search for corner anchor points. For example, in certain implementations, the part-level transformation system 106 identifies an intersection anchor point and then begins searching for a next anchor point that qualifies as a corner anchor point as described above.

At an act 510, the part-level transformation system 106 applies threshold segment lengths and/or threshold curvature deviations for noise reduction and path expansion. In particular embodiments, the act 510 allows the part-level transformation system 106 to determine corner anchor points and/or intersection anchor points given the imperfections and noise (e.g., bumps, dips, jagged edges) introduced from selecting a subpart of a raster image. To illustrate, the act 510 in FIG. 5B depicts anchor points (e.g., for corners) clustered in certain areas due to raster image noise. Accordingly, in certain implementations, the part-level transformation system 106 performs the act 510 in parallel with or as part of the act 508 described above.

For example, in certain implementations, the part-level transformation system 106 searches for a corner anchor point by ignoring corners or anchor points that correspond to insignificant path segments failing to satisfy a threshold segment length. To illustrate, the part-level transformation system 106 uses a threshold segment length based on a total path segment length (e.g., a summation of segment length for path segments 520a-520i) corresponding to the influenced region. In some embodiments, the threshold segment length comprises a length factor or length ratio (e.g., 0.05, 0.1, 0.2, 0.4) applied to the total path segment length corresponding to the influenced region. Accordingly, in one example, the part-level transformation system 106 bypasses corners or anchor points present along path segments that are less than 5% of the total path segment length corresponding to the influenced region.

To provide an example, the part-level transformation system 106 ignores at least corner anchor point 516d. In particular, the part-level transformation system 106 ignores the corner anchor point 516d in response to determining that both path segments 520e, 520f joined at the corner anchor point 516d are insignificant path segments that each fails to satisfy a threshold segment length. Additionally, for instance, the part-level transformation system 106 may also ignore corner anchor point 516e that corresponds to the insignificant path segment 520f and corner anchor point 516c that corresponds to the insignificant path segment 520e. In other instances, however, the part-level transformation system 106 does not ignore corner anchor points 516c, 516e because these anchor points also correspond to path segments 520d, 520g that do satisfy a threshold segment length. Additionally, the part-level transformation system 106 can also ignore these corner anchor points where the part-level transformation system 106 has already identified earlier corner anchor points 516a, 516f in sequentially analyzing anchor points from the intersection points 514a, 514b.

In some embodiments, the part-level transformation system 106 uses a threshold segment length based on statistical analyses of path segment length. For example, in certain implementations, the part-level transformation system 106 determines a threshold segment length based on an average path segment length or a median path segment length (e.g., for all path segments correspond to the influenced region). As another example, the part-level transformation system 106 determines a distribution of path segment lengths for the influenced region. In turn, the part-level transformation system 106 can determine a threshold path segment length based on the distribution (e.g., such that the threshold segment length includes two standard deviations worth of path segments).

Additionally or alternatively to applying a threshold segment length, certain embodiments of the part-level transformation system 106 apply a threshold curvature deviation when searching for a corner anchor point. In particular embodiments, the part-level transformation system 106 applies the threshold curvature deviation to significant path segments that satisfy the threshold segment length described above. For example, given a significant path segment, the part-level transformation system 106 analyzes a curvature or slope at particular location intervals along the given path segment. In some embodiments, the part-level transformation system 106 determines that the threshold curvature deviation is satisfied when a change in slope between one or more positions along the given path segment is greater than or equal to the threshold curvature deviation. Additionally or alternatively, in some embodiments, the part-level transformation system 106 determines that the curvature deviation is satisfied when slope changes from positive to negative within the given path segment.

If the part-level transformation system 106 determines that a significant path segment satisfies the curvature deviation threshold, certain embodiments of the part-level transformation system 106 stop the search and consider the immediately preceding anchor point as a corner anchor point. Otherwise, the part-level transformation system 106 continues the search for a corner anchor point when a significant path segment does not satisfy a threshold curvature deviation.

It can be appreciated that the threshold segment length, the threshold curvature deviation, and/or angle definition for a corner described above may be determined or altered in a variety of ways. In some embodiments, the foregoing values or parameters are preset values. In other embodiments, the foregoing values or parameters are learned or optimized based on geometrical inputs, heuristic accuracy, etc. Additionally or alternatively, the foregoing values or parameters are adjustable via one or more user interface options or elements (e.g., via navigable menu options and/or slidably adjustable button slider(s) of a user interface of a client device).

In some embodiments, the act 510 includes the part-level transformation system 106 implementing additional or alternative methods for applying noise reduction and path expansion. Indeed, in certain implementations, the part-level transformation system 106 implements one or more smoothing algorithms, regression models, etc. to improve accuracy and/or runtime speed for more accurate anchor point determinations.

At an act 512, the part-level transformation system 106 determines an active path segment 522, a deformable path segment 524, and a fixed path segment 526. There are variety of different ways to determine the different types of path segments. For example, in some embodiments, the part-level transformation system 106 uses one or more corner anchor points, intersection anchor points, and/or regular anchor points to determine the different types of path segments.

To illustrate, the part-level transformation system 106 determines the active path segment 522 by determining a path segment (or group of path segments) based on intersection anchor points as described above. For instance, in one or more embodiments, the part-level transformation system 106 identifies all path segments between two intersection anchor points. In turn, the part-level transformation system 106 can define the identified path segments between the two intersection anchor points as the active path segments. In specific implementations, the part-level transformation system 106 determines the active path segments are path segments that both correspond to the active region and are positioned between two intersection anchor points (e.g., the intersection anchor points 514a, 514b mentioned above). In this manner, the part-level transformation system 106 defines the active path segments that can translate relative to the influenced region.

Additionally, in one or more embodiments, the part-level transformation system 106 determines the deformable path segment 524. The deformable path segment 524 includes one or more path segments that can transform (e.g., warp, stretch, compress, etc.) in response to user interaction to translate an active path segment, such as the active path segment 522. In some embodiments, the part-level transformation system 106 determines the deformable path segment 524 based on a combination of intersection anchor points and corner anchor points. In particular embodiments, the part-level transformation system 106 identifies all path segments between an intersection anchor point and a corner anchor point. In turn, the part-level transformation system 106 can determine that the identified path segments are deformable path segments. In certain implementations, the part-level transformation system 106 determines the deformable path segment 524 comprises one or more path segments that both correspond to the influenced region and are positioned between an intersection anchor point and a next corner anchor point. For instance, one deformable path segment 524 comprises the path segments 520a, 520b that both correspond to the influenced region and are positioned between the intersection anchor point 514b and the next corner anchor point 516a as mentioned above.

Further, in one or more embodiments, the part-level transformation system 106 determines the fixed path segment 526. The fixed path segment 526 includes one or more path segments that remain unchanged and positionally fixed (e.g., no affine transformations or deformation) in response to user interaction with an active path segment. In particular embodiments, the part-level transformation system 106 determines the fixed path segment 526 comprises all remaining path segments of a boundary vector path that are neither active path segments nor deformable path segments. In certain implementations, the part-level transformation system 106 determines the fixed path segment 526 as all path segments positioned between two corner anchor points (e.g., between corner anchor points that are immediately adjacent to corresponding intersection anchor points). For instance, one fixed path segment 526 comprises the path segments 520c-520h between corner anchor points 516a, 516g discussed above. In this manner, the part-level transformation system 106 can determine fixed path segments that adjoin or connect transitional path segments (e.g., the deformable path segments) of a subpart with the rest of an object.

Further, in some embodiments, the part-level transformation system 106 determines one or more of the active path segment 522, the deformable path segment 524, and/or the fixed path segment 526 in a manner independent of the above heuristics relating to intersection anchor points and/or corner anchor points. As one of many examples, the part-level transformation system 106 determines the different types of path segments utilizing an interactive approach. For instance, the part-level transformation system 106 utilizes one or more similar approaches described above for identifying the active region and the influenced region, but in connection with boundary areas of the subpart. To illustrate, in certain implementations, the part-level transformation system 106 identifies one or more of the active path segment 522, the deformable path segment 524, and/or the fixed path segment 526 in response to a digital selection tool or user indicator indicating a boundary of the active region and/or the influenced region. In particular embodiments, the part-level transformation system 106 utilizes this interactive approach for providing a custom user selection and/or a correction of certain path segment(s) initially identified.

As another example, the part-level transformation system 106 can determine types of path segments using a neighborhood pixel analysis (e.g., as described above for certain instances of boundary vector path generation). In this example, an active path segment can correspond to portions of the boundary vector path adjacent to pixels of the active region. Likewise, a deformable path segment can correspond to portions of the boundary vector path that are adjacent to pixels of the influenced region but not adjacent to pixels of the object outside of the subpart.

Moreover, it can be appreciated that the part-level transformation system 106 is not required to determine each type of path segment for a given subpart. Indeed, geometries of subparts differ from subpart to subpart. As such, not every type of path segment is always present or applicable. For example, in some embodiments, the part-level transformation system 106 does not determine a fixed path segment corresponding to a subpart because there are no path segments that do not already correspond to an active path segment or a deformable path segment.

Furthermore, one or more embodiments of the part-level transformation system 106 utilize different heuristics than those described above to determine one or more of the active path segment 522, the deformable path segment 524, and/or the fixed path segment 526. For example, an active path segment is not necessarily limited to all path segments between two intersection anchor points. In some embodiments, an active path segment includes path segments between an intersection anchor point and another type of anchor point, such as a corner anchor point or a regular anchor point. Similarly, a deformable path segment is not necessarily limited to all path segments between an intersection anchor point and a next corner anchor point. In some embodiments, a deformable path segment includes path segments from an intersection anchor point to one or more subsequent corner anchor points (instead of a next corner anchor point).

As mentioned above, the part-level transformation system 106 can determine transformation constraints on a segment-specific basis. In so doing, the part-level transformation system 106 can efficiently and accurately modify a subpart. FIG. 6 illustrates the part-level transformation system 106 determining transformation constraints for path segments in accordance with one or more embodiments.

As shown for an act 602, the part-level transformation system 106 determines one or more transformation constraints for an active path segment. Numerous different transformation constraints can apply to the active path segment, including different transformation constraints and/or different values of transformation constraints for different active path segments.

In one or more embodiments, the part-level transformation system 106 determines a transformation constraint for constraining the translation of an active path segment based on the slope of surrounding path segments. In particular embodiments, the part-level transformation system 106 constrains the slope of translation (shown as slope t) for an active path segment according to the slope of one or more deformable path segments (e.g., slope x, slope y, and slope z) and/or the slope of one or more fixed path segments (e.g., slope w). In this manner, the part-level transformation system 106 can limit or avoid unnatural (e.g., illogical) transformations of the subpart.

To illustrate, in some embodiments, the part-level transformation system 106 constrains the translation of one or more active path segments. To do so, certain embodiments of the part-level transformation system 106 determine a slope threshold that limits a direction of translation (e.g., the translation line of slope t) for the active path segment(s) selected to be moved. For example, in selecting an active path segment 608 to be moved, the part-level transformation system 106 determines a slope threshold comprising a range of slopes between slope x and slope y. In this manner, the slope threshold limits the slope t of the translation line to not exceed either slope x or slope y. Additionally, for instance, the part-level transformation system 106 similarly determines a slope threshold comprising a range of slopes between slope z and slope w for moving an active path segment 610.

If moving both the active path segments 608, 610, certain embodiments of the part-level transformation system 106 can implement alternative approaches. In a first example approach, the part-level transformation system 106 determines the slope threshold using a combination of all slopes for the deformable path segments. In a second example approach, the part-level transformation system 106 allows movement of both active path segments, but does not determine or a apply a slope threshold unless certain criteria are satisfied. For instance, the part-level transformation system 106 only determines an applicable slope threshold if certain slopes of the deformable path segments are equivalent (e.g., slope x=slope z and/or slope y=slope w). In some instances, this second approach can help avoid over constraining the path segments.

As mentioned previously, in one or more embodiments, the part-level transformation system 106 maps user interactions with transformation handles to one or more transformation constraints. In particular embodiments, the part-level transformation system 106 restricts the free-form translation of a transformation handle to reduce or avoid shape distortion caused by extreme movement of parts. In certain implementations, a mapping of user interactions to transformation constraints is adjustable (e.g., via one or more user settings or user interface elements). Additionally or alternatively, a mapping of user interactions to transformation constraints can be turned off (e.g., to more freely allow creation and imagination).

Additionally or alternatively, in some embodiments, the part-level transformation system 106 determines the slope threshold based on the existing slopes of one or more active path segments (e.g., the active path segments 608, 610). In certain implementations, the part-level transformation system 106 determines a slope threshold based on the active path segment not being moved. In this manner, the part-level transformation system 106 can translate an active path segment in way that remains consistent (e.g., parallel to) non-translated active path segments. To illustrate, if moving only the active path segment 608, the part-level transformation system 106 determines a slope threshold as comprising a slope perpendicular (e.g., about ninety degrees relative) to a slope of the active path segment 610. Similarly for instance, if moving only the active path segment 610, the part-level transformation system 106 determines a slope threshold based on a slope of the active path segment 608. In these cases, the part-level transformation system 106 may constrain slope t for the translation line to be the same as (or within a threshold range of) the slope threshold.

In these or other embodiments, the part-level transformation system 106 determines a slope of a path segment using a variety of techniques. In some embodiments, the part-level transformation system 106 uses a linear based approach by determining a rise over run (e.g., using a slope intercept formula) measured according to pixels, millimeters, or other suitable distance. In other embodiments, the part-level transformation system 106 uses an approximation based approach. The approximation based approach can include the part-level transformation system 106 using tangents of curves, determining a function, performing regression analysis, identifying a derivative or gradient, etc.

Additionally or alternatively to slope thresholds, certain embodiments of the part-level transformation system 106 determine one or more fixed affine constraints for active path segments. For example, the part-level transformation system 106 determines one or more parameters for controlling scaling, rotation, and/or translation of an active path segment. Additionally, for instance, the part-level transformation system 106 determines the fixed affine constraint comprises one or more parameters that preserve collinearity of anchor points associated with an active path segment during an affine transformation. For example, the fixed affine constraint can dictate that translation of the active path segments 608, 610 only occurs in a particular direction, and that all curvature and lines of the active path segments 608, 610 will move together in a same direction (not independent of each other). Similarly for instance, the part-level transformation system 106 determines the fixed affine constraint comprises one or more parameters that preserve ratios of distances for active path segments during an affine transformation. For example, an active path segment of 10 millimeters in length translates in response to user interaction, but remains the same 10 millimeters in length. In certain implementations, the fixed affine constraint maps or limits user gestures (e.g., a drag or swipe) to an affine transformation or multiple affine transformations of an active path segment, such as scaling, rotation, and/or translation.

At an act 604, the part-level transformation system 106 determines one or more transformation constraints for a deformable path segment. For example, the part-level transformation system 106 determines a similarity transform constraint. In some embodiments, the similarity transform constraint comprises one or more parameters for applying a nearest similarity transform that maintains approximate shape, radius of curvature, angle, etc. during modification of a deformable path segment. For example, as a deformable path segment transforms, the part-level transformation system 106 uses a similarity transform constraint to maintain the general profile of the deformable path segment (e.g., straight lines remain approximately straight, curved lines remain similarly curved, etc.).

In another example at the act 604, the part-level transformation system 106 determines one or more continuity constraints for a deformable path segment. For instance, the part-level transformation system 106 determines a C1 smoothness continuity constraint. In certain implementations, the C1 smoothness continuity constraint preserves the curvature of a path segment such that the $0^{th}$ and $1^{st}$ derivatives are continuous. In this instance, the part-level transformation system 106 maintains a smoothness for a path segment such that a given path segment satisfies the following example expression: A path segment s: $[0,1] \rightarrow \mathbb{R}^n$ is said to be of class $C^k$, if the derivative $d^k s/dt^k$ exists and is continuous on $[0,1]$, where derivatives at the end-points $0,1 \in [0,1]$ are one-sided derivatives (i.e., at 0 from the right, and at 1 from the left).

Additionally or alternatively for instance, the part-level transformation system 106 determines a G1 curvature continuity constraint. In particular embodiments, the G1 curvature continuity constraint preserves the smoothness of path segments such that path segments sharing a common tangent direction at an anchor point or junction continue to do so. In this instance, the part-level transformation system 106 maintains a smoothness between path segments such that path segments satisfy the following example expression: $G^n$ continuity exists (or is maintained) if the path segments can be reparameterized to have $G^n$ parametric continuity, where a reparameterization of a path segment is geometrically identical to the original and only the parameter differs. By applying a C1 and/or G1 smoothness continuity constraint, the part-level transformation system 106 can generate a smooth transition within the deformable path segment and avoid jarring discontinuities in the modified digital image.

At an act 606, the part-level transformation system 106 determines one or more transformation constraints for a fixed path segment. In particular embodiments, the part-level transformation system 106 determines a fixed constraint that prevents modifications of various kinds, such as a deformation or translation. Indeed, in certain implementations, the part-level transformation system 106 determines one or more fixed constraints that lock in a fixed path segment so as to remain fixed (immovable or unchangeable) in its respective location.

In some embodiments, the part-level transformation system 106 does not determine transformation constraints for each type of path segment. For example, as mentioned previously, geometries of subparts differ from subpart to subpart. As such, not every type of path segment is always present or applicable. Additionally or alternatively, one or more embodiments of the part-level transformation system 106 may omit transformation constraints for certain path segments (e.g., in order to avoid issues from locking and infeasibility as described in Kaufman).

Moreover, it can be appreciated that one or more transformation constraints discussed above may apply to a variety of different types of path segments (albeit discussed in relation to a specific type of path segment). For example, in certain implementations, the part-level transformation system 106 determines continuity constraints for any type of path segment. Indeed, one or more embodiments of the part-level transformation system 106 infer and/or apply C1/G1 continuity constraints for each path segment based on input geometry associated with a subpart.

As mentioned above, one or more embodiments of the part-level transformation system 106 can generate and provide various user interfaces for display on a client device (e.g., for intuitive part-level editing of digital images). FIGS. 7A-7D illustrate the part-level transformation system 106 providing user interfaces 702a-702d on a computing device 700 in accordance with one or more embodiments.

In particular, the user interfaces 702a-702d include a subpart 704. Although not illustrated, the subpart 704 corresponds to an object portrayed within a digital image (as described in relation to the foregoing figures). For example, the subpart 704 corresponds to a segmented object that a user has interacted with to identify the subpart 704 (e.g., via one or more digital paint tools, fill tools, etc.). Indeed, the user interfaces 702a-702d include an active region 706 (a bike frame down tube or $A_r$). The bike frame down tube is the part to modify or $P_m$ that the user wishes to modify in a shape constrained manner, known as an active region ($A_r$). Additionally, the user interfaces 702a-702d include influenced regions 710 (the connecting bike frame portions) depicted within the subpart 704. The influenced regions 710 can correspond to selection of adjoining parts ($A_{p(i)}$) connected directly or indirectly with the $P_m$, known as the region of influence $I_{R(i)}$. The rest of the object (or bike) is not shown in the user interfaces 702a-702d. For reference though, all object regions apart from the $A_R$ and the $I_{R(i)}$ include the passive regions ($P_R$) that do not undergo any deformation or transformation when the $P_m$ is modified.

Further shown, the user interfaces 702a-702d include a boundary vector path 708. As described above, the part-level transformation system 106 generates the boundary vector path 708 based on identifying the active region 706 and the influenced regions 710. For instance, the part-level transformation system 106 generates the boundary vector path 708 by generating path segments that outline the subpart 704 so as to define a mesh for the active region 706 and the influenced regions 710. That is, the part-level transformation system 106 generates the boundary vector path 708 by outlining the regions $P_m$ and ($A_{p(i)}$) and identifying associated transformation constraints. As mentioned previously, transformation constraints allow the part-level transformation system 106 to transform the $P_m$ while maintaining properties of the part's shape and adjoining parts.

Figure 7A:
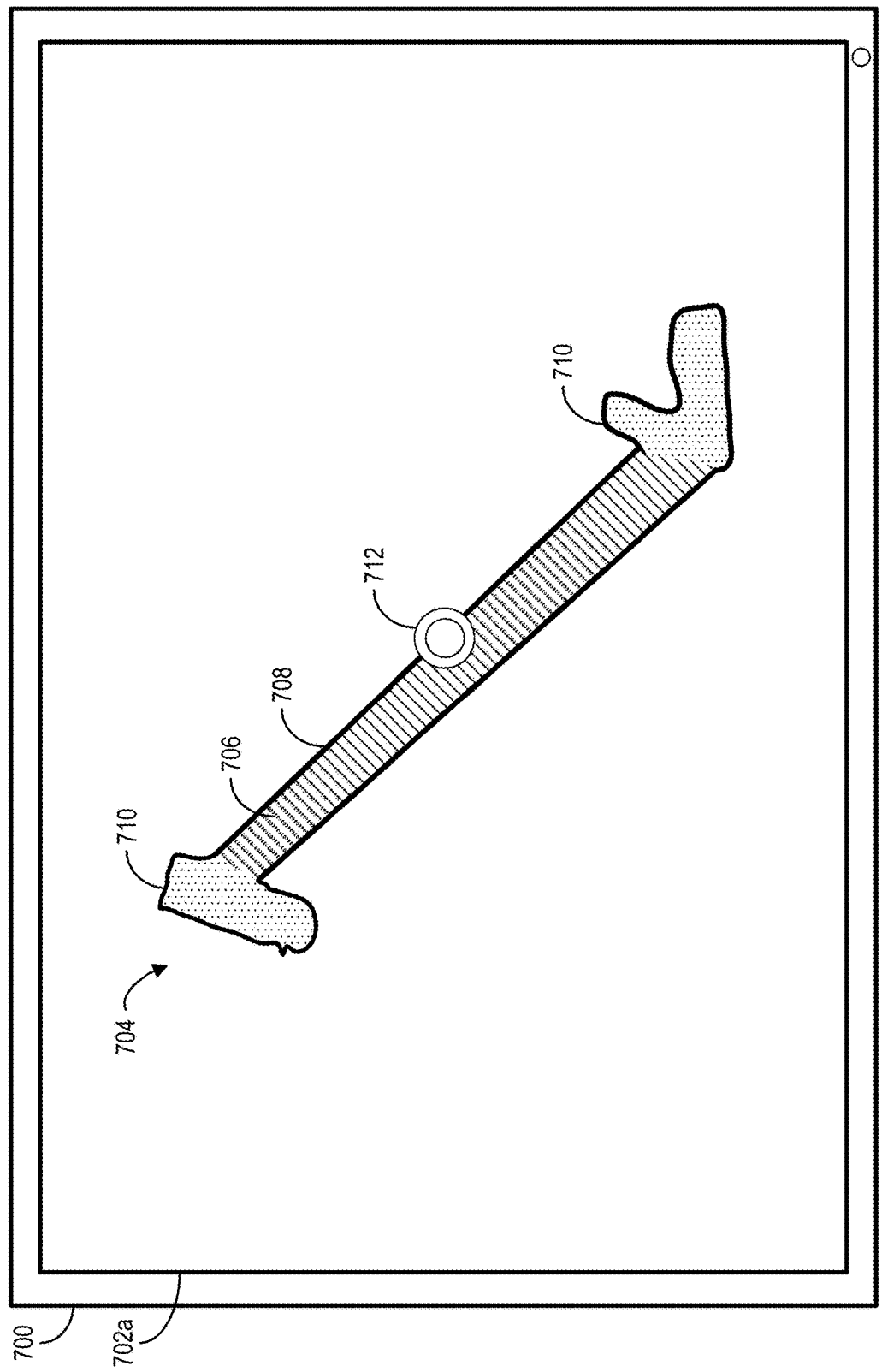

Specifically, as shown in FIG. 7A, the user interface 702a includes a tool indicator 712 hovering over or selecting a particular active path segment (or group of active path segments) of the boundary vector path 708 to move. In one or more embodiments, the tool indicator 712 comprises one or more selection tools, a mouse cursor, etc.

In FIG. 7B, the user interface 702b shows the part-level transformation system 106 responding to the user interaction depicted in FIG. 7A. In particular, the part-level transformation system 106 generates a transformation handle 714 for intuitively and interactively translating a portion of the boundary vector path 708 selected in FIG. 7A. That is, by interacting with (e.g., dragging or sliding) the transformation handle 714, the part-level transformation system 106 can correspondingly move the active path segment of the boundary vector path 708 represented by a selection 716. In this manner, the part-level transformation system 106 can provide intuitive, high-level transformation handles for modifying the $P_m$ while also maintain the higher level structural constraints between the $P_m$ and the $A_{p(i)}$.

In particular, the part-level transformation system 106 can translate the active path segment of the boundary vector path 708 to increase or decrease the diameter of the bike frame down tube in accordance with one or more transformation constraints for the active path segment of the boundary vector path 708. Additionally, the part-level transformation system 106 can deform one or more deformable path segments to accurately and efficiently transition connecting portions to the bike frame down tube in accordance with one or more transformation constraints for deformable path segments of the boundary vector path 708.

Figure 7C:
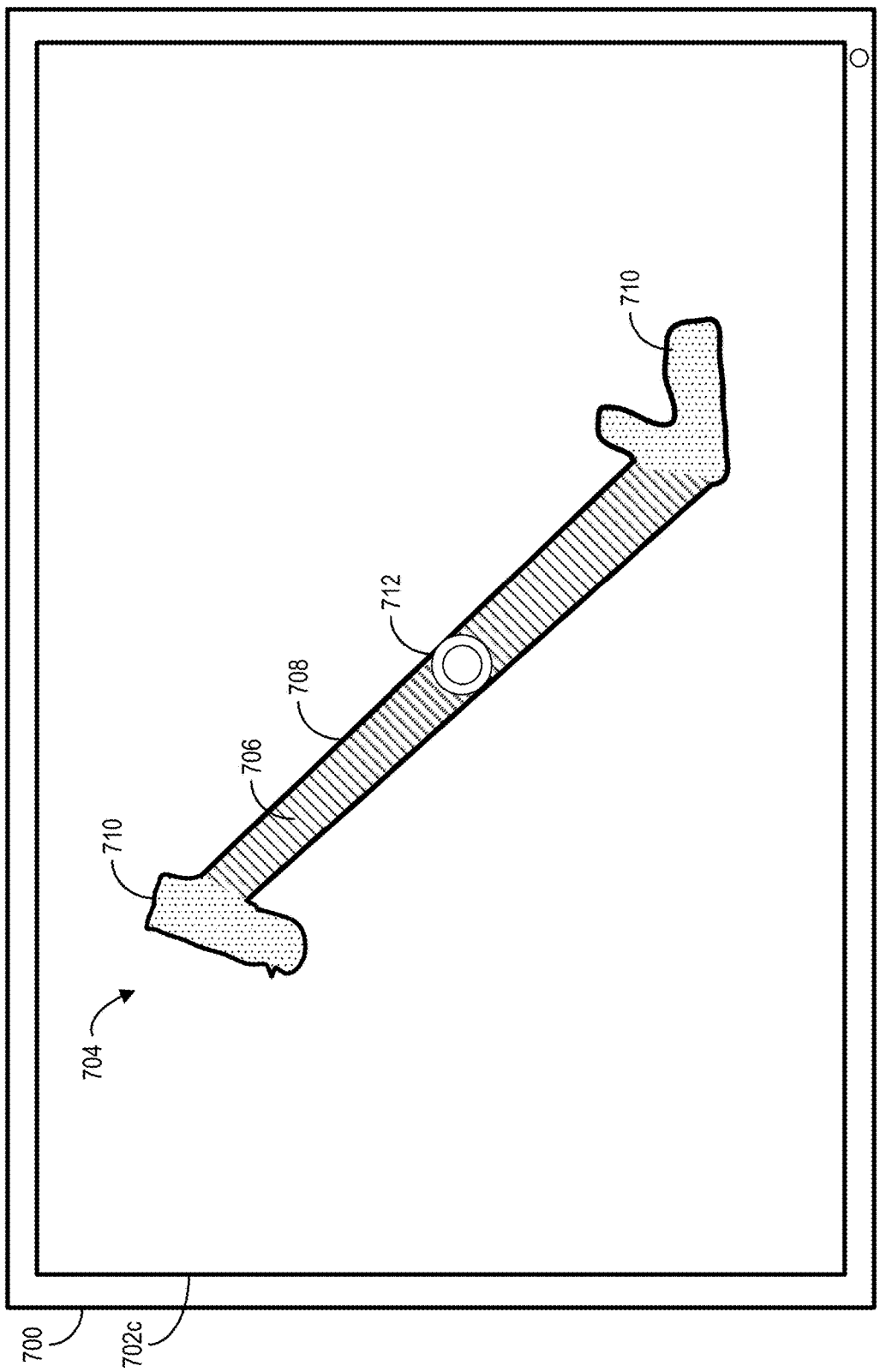

In FIG. 7C, the user interface 702c depicts a different user interaction than illustrated in FIG. 7A. In particular, the user interface 702c includes the tool indicator 712 hovering over or selecting an interior portion of the active region 706 (as opposed to a portion of the boundary vector path 708 for the active region). In response to detecting the user interaction, the part-level transformation system 106 identifies the active region 706 as a whole for moving.

Figure 7D:
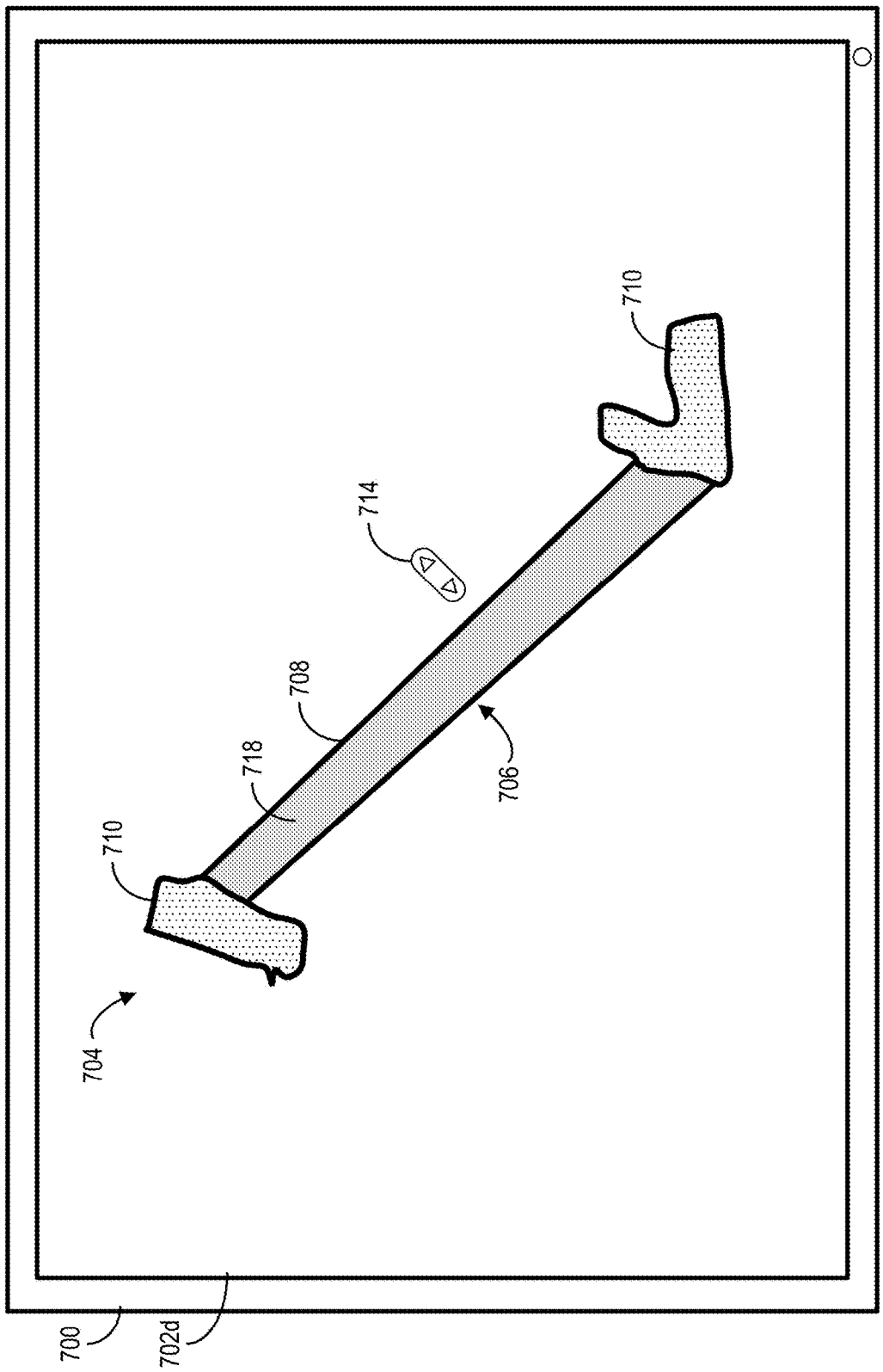

For example, as shown in FIG. 7D, the user interface 702d shows the part-level transformation system 106 depicting a selection 718 ready for interactively translating via the transformation handle 714. In particular, the selection 718 comprises an entirety of the active region 706. Thus, in response to user interaction with the transformation handle 714, the part-level transformation system 106 can correspondingly move the active region 706.

In so doing, the part-level transformation system 106 can shift a position of the active region 706 as a whole (as opposed to increasing or decreasing the diameter of the bike frame down tube). That is, the part-level transformation system 106 can move the active region 706 up and down along a translation line according to one or more transformation constraints for the active path segments being moved. Further, the part-level transformation system 106 can deform one or more deformable path segments for the influenced regions 710 according to one or more transformation constraints for deformable path segments of the boundary vector path 708. In this manner, the part-level transformation system 106 can shift a position of the bike frame down tube while maintaining realistic connections to the adjoined bike frame members.

Figure 8A:
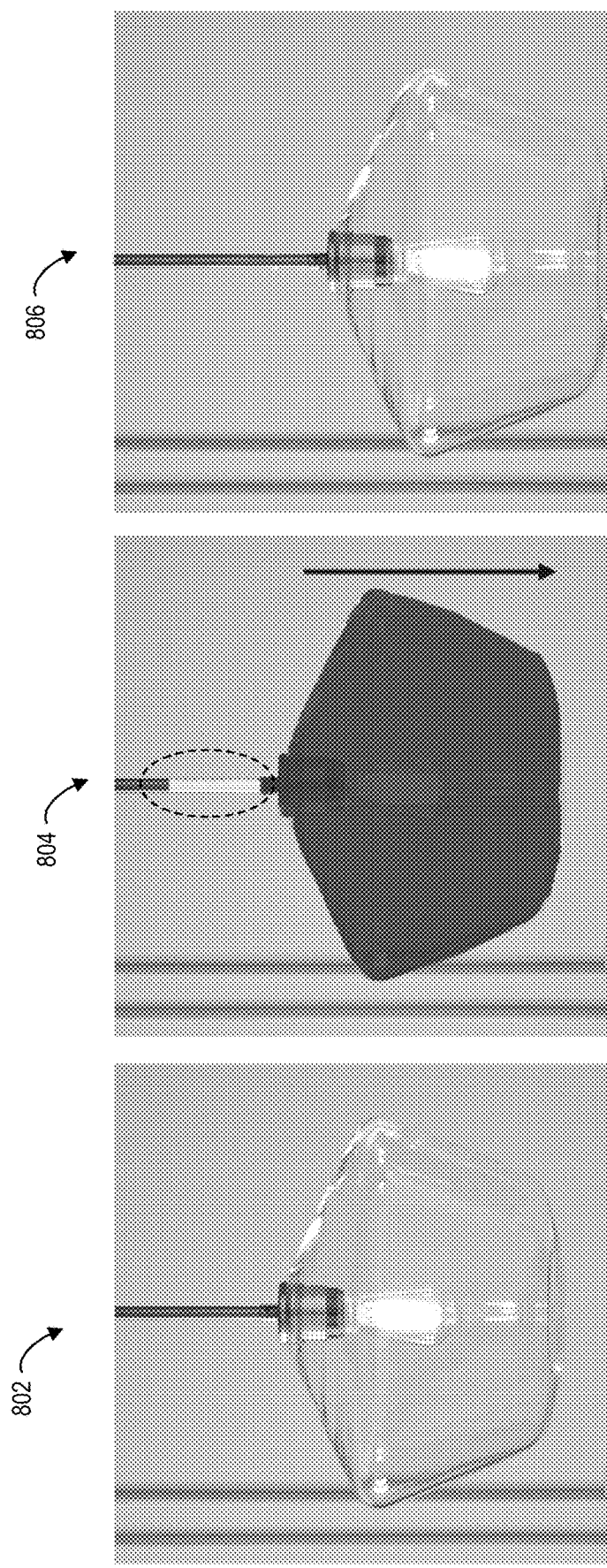
FIGS. 8A-8B illustrate experimental results of implementing a part-level transformation system in accordance with one or more embodiments.
Figure 8B:
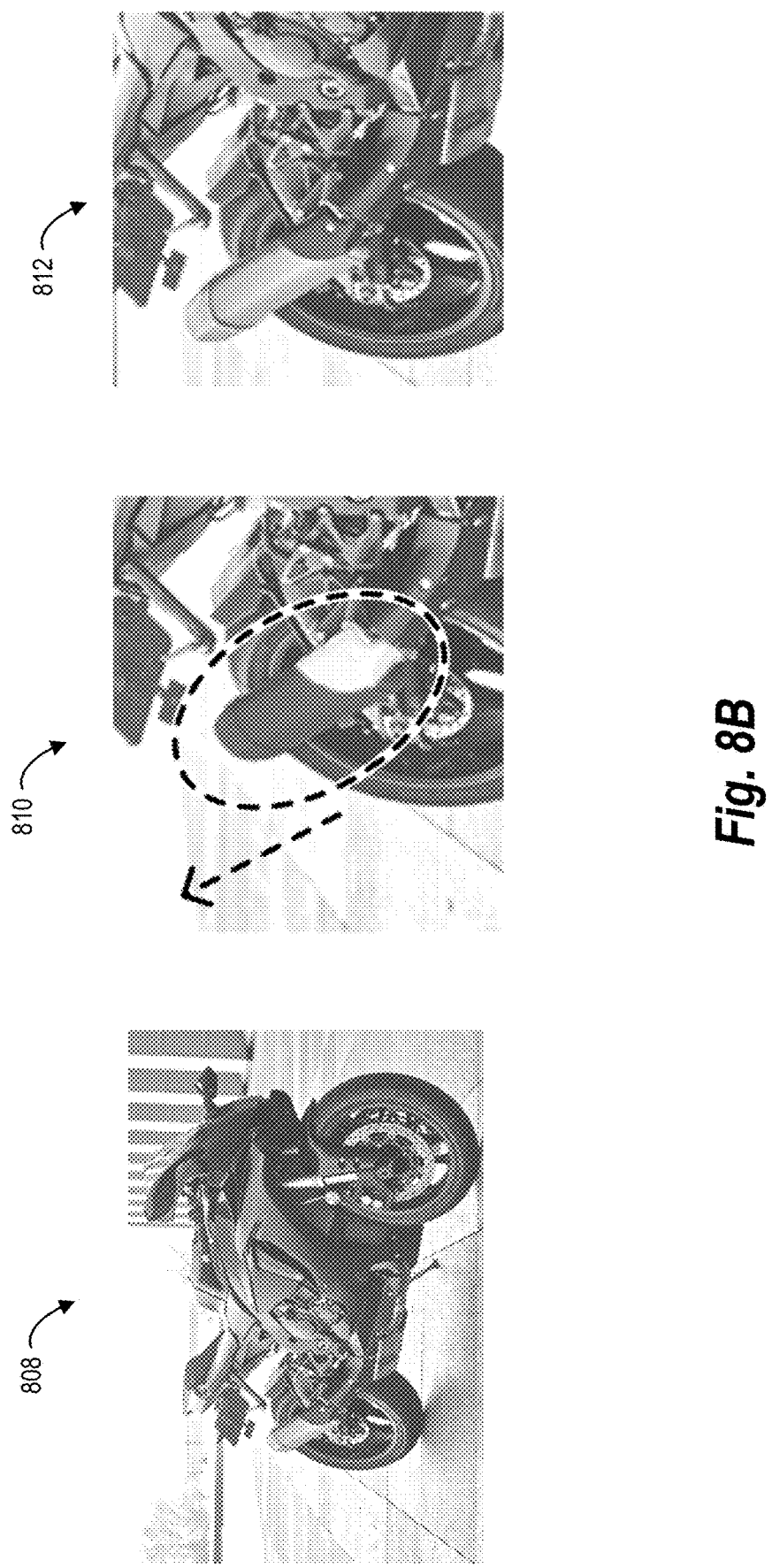

As mentioned above, the part-level transformation system 106 can accurately and efficiently render digital images with modified subparts. FIGS. 8A-8B illustrate experimental results of implementing the part-level transformation system 106 in accordance with one or more embodiments.

For example, in FIG. 8A, the part-level transformation system 106 processes a digital image 802 comprising a light fixture (e.g., by generating a segmentation of the light fixture). As depicted in a digital image 804, the part-level transformation system 106 then identifies one or more user interactions with the segmented object to determine a subpart comprising an active region and an influenced region. In this example of a light fixture, the active region comprises the light fixture housing (denoted via shading), and the influenced region comprises the rod or conduit of the light fixture (denoted via dashed lines). In response to one or more user interactions (e.g., with a transformation handle), a digital image 806 depicts the part-level transformation system 106 generating a realistic, modified light fixture. That is, the digital image 806 shows the part-level transformation system 106 having shifted the light fixture housing down by morphing or extending the rod or conduit of the light fixture (e.g., based on one or more transformation constraints described above).

As another example in FIG. 8B, the part-level transformation system 106 similarly processes a digital image 808 comprising a motorcycle. For instance, the part-level transformation system 106 automatically or interactively generates a segmentation of the motorcycle. Subsequently, as depicted in a digital image 810, the part-level transformation system 106 identifies one or more user interactions with the segmented motorcycle to determine a subpart comprising an exhaust tail pipe (denoted via dashed lines). Specifically, the part-level transformation system 106 determines a portion of the exhaust pipe as corresponding to the active region (denoted via dark shading) and another portion of the exhaust pipe as corresponding to the influenced region (denoted via light shading). Based on one or more user interactions (e.g., with a transformation handle), a digital image 812 depicts the part-level transformation system 106 generating an accurate tail pipe extension.

Figure 9:
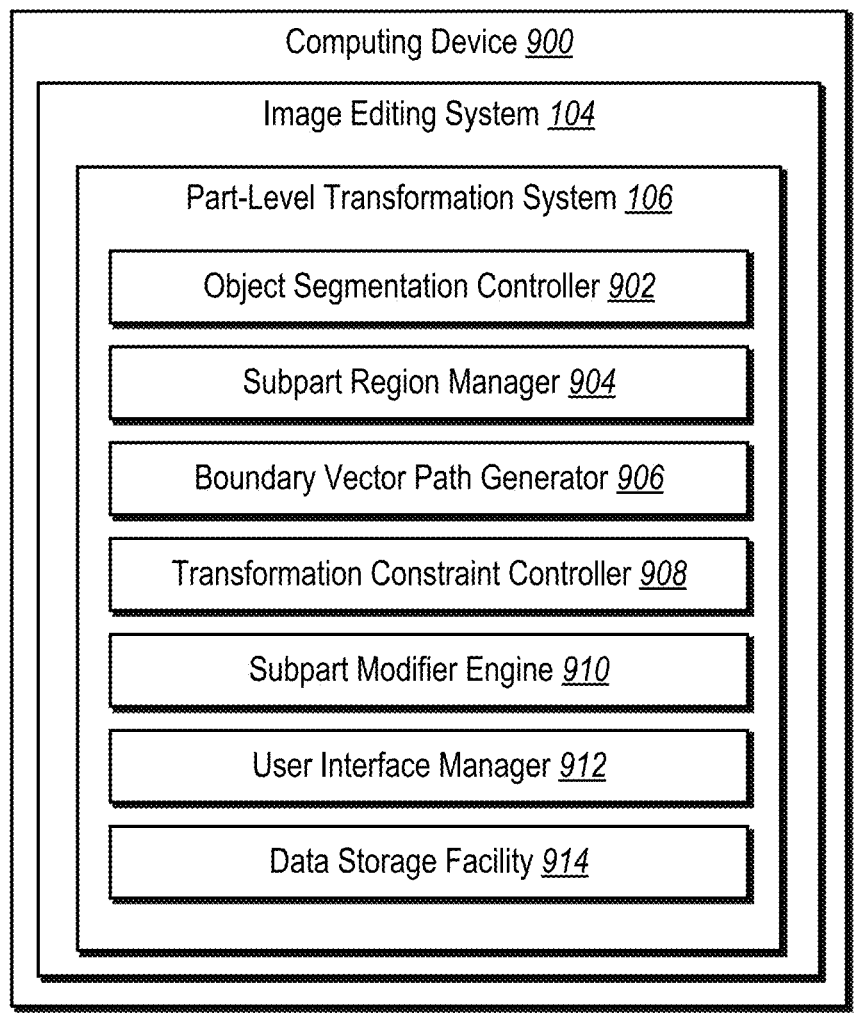
FIG. 9 illustrates an example schematic diagram of a part-level transformation system in accordance with one or more embodiments.

Turning to FIG. 9, additional detail will now be provided regarding various components and capabilities of the part-level transformation system 106. In particular, FIG. 9 illustrates an example schematic diagram of a computing device 900 (e.g., the server(s) 102, the client device 108, and/or the computing device 700) implementing the part-level transformation system 106 in accordance with one or more embodiments of the present disclosure. As shown, the part-level transformation system 106 is implemented by the image editing system 104. Also illustrated, the part-level transformation system 106 includes an object segmentation controller 902, a subpart region manager 904, a boundary vector path generator 906, a transformation constraint controller 908, a subpart modifier engine 910, a user interface manager 912, and a data storage facility 914.

The object segmentation controller 902 generates, obtains, retrieves, transmits, and/or stores object segmentations (as described in relation to the foregoing figures). In particular embodiments, the object segmentation controller 902 utilizes an object segmentation model (e.g., a salient object segmentation neural network) to automatically generate an object segmentation of one or more objects portrayed in a digital image. In other embodiments, the object segmentation controller 902 identifies user interactions to interactively segment one or more objects portrayed in a digital image.

The subpart region manager 904 generates, identifies, stores, and/or transmits an active region and an influenced region of a subpart (as described in relation to the foregoing figures). In particular embodiments, the subpart region manager 904 detects a user interaction with one or more digital selection tools that, when applied, indicate pixels or groups of pixels of the digital image corresponding to the active region and the influenced region. In other embodiments, the subpart region manager 904 uses one or more of edge detection algorithms, segmentation models, neural networks, etc. to process a digital image and predict at least one of the active region or the influenced region (e.g., for a candidate subpart).

The boundary vector path generator 906 generates, obtains, identifies, stores, and/or transmits a boundary vector path (as described in relation to the foregoing figures). In particular embodiments, the boundary vector path generator 906 generates a boundary vector path for a subpart by determining an outline around the union of the active region and the influenced region of the subpart. For example, in certain implementations, the boundary vector path generator 906 utilizes edge detection algorithms or pixel gradient analyses to determine a pixel path. Along this pixel path, the boundary vector path generator 906 can generate a series of lines or curves (e.g., path segments) to create a vectorized perimeter border of the subpart. In turn, the boundary vector path generator 906 generates anchor points at end points, junctions, or other locations for the path segments.

The transformation constraint controller 908 generates, determines, obtains, stores, and/or transmits transformation constraints (as described in relation to the forgoing figures) for a boundary vector path. In particular embodiments, the transformation constraint controller 908 determines a respective transformation constraint for each portion of a boundary vector path (e.g., each path segment and/or type of path segment). For example, the transformation constraint controller 908 determines a first transformation constraint for an active path segment, a second transformation constraint for a deformable path segment, and a third transformation constraint for a fixed path segment (as applicable). To illustrate, in certain implementations, the transformation constraint controller 908 determines a slope threshold and/or one or more fixed affine constraints for an active path segment, a similarity transform constraint for a deformable path segment, and a fixed constraint for a fixed path segment.

The subpart modifier engine 910 generates, determines, renders, stores, and/or transmits modified subparts within a digital image (as described in relation to the foregoing figures). In particular embodiments, the subpart modifier engine 910 modifies a subpart by modifying a boundary vector path and a mesh corresponding to the active region and the influenced region using the one or more transformation constraints. In one example, the subpart modifier engine 910 uses a shape-aware transform solver to process a digital image, various transformation constraints, and/or translation data corresponding to a user interaction with transformation handles.

In one or more embodiments, the user interface manager 912 provides, manages, and/or controls a graphical user interface (or simply "user interface"). In particular embodiments, the user interface manager 912 generates and displays a user interface by way of a display screen composed of a plurality of graphical components, objects, and/or elements that allow a user to perform a function. For example, the user interface manager 912 receives user inputs from a user, such as a click/tap to view, edit, interact with, or transmit a digital image. Additionally, in one or more embodiments, the user interface manager 912 presents a variety of types of information, including text, rendered digital images, or other information for presentation in a user interface.

The data storage facility 914 maintains data for the part-level transformation system 106. The data storage facility 914 (e.g., via one or more memory devices) maintains data of any type, size, or kind, as necessary to perform the functions of the part-level transformation system 106. For example, the data storage facility 914 stores digital image portraying objects having a plurality of subparts. As additional examples, the data storage facility 914 stores transformation constraints, a shape-aware transform solver, etc.

Each of the components of the computing device 900 can include software, hardware, or both. For example, the components of the computing device 900 can include one or more instructions stored on a computer-readable storage medium and executable by processors of one or more computing devices, such as a client device or server device. When executed by the one or more processors, the computer-executable instructions of the part-level transformation system 106 can cause the computing device(s) (e.g., the computing device 900) to perform the methods described herein. Alternatively, the components of the computing device 900 can include hardware, such as a special-purpose processing device to perform a certain function or group of functions. Alternatively, the components of the computing device 900 can include a combination of computer-executable instructions and hardware.

Furthermore, the components of the computing device 900 may, for example, be implemented as one or more operating systems, as one or more stand-alone applications, as one or more modules of an application, as one or more plug-ins, as one or more library functions or functions that may be called by other applications, and/or as a cloud-computing model. Thus, the components of the computing device 900 may be implemented as a stand-alone application, such as a desktop or mobile application. Furthermore, the components of the computing device 900 may be implemented as one or more web-based applications hosted on a remote server.

The components of the computing device 900 may also be implemented in a suite of mobile device applications or "apps." To illustrate, the components of the computing device 900 may be implemented in an application, including but not limited to ILLUSTRATOR®, PHOTOSHOP®, PHOTOSHOP® ELEMENTS, LIGHTROOM®, LIGHTROOM® FOR MOBILE, ADOBE® PREMIERE®, ADOBE® PREMIERE® PRO, or ADOBE® PREMIERE® ELEMENTS. Product names, including "ADOBE" and any other portion of one or more of the foregoing product names, may include registered trademarks or trademarks of Adobe Inc. in the United States and/or other countries.

Figure 10:
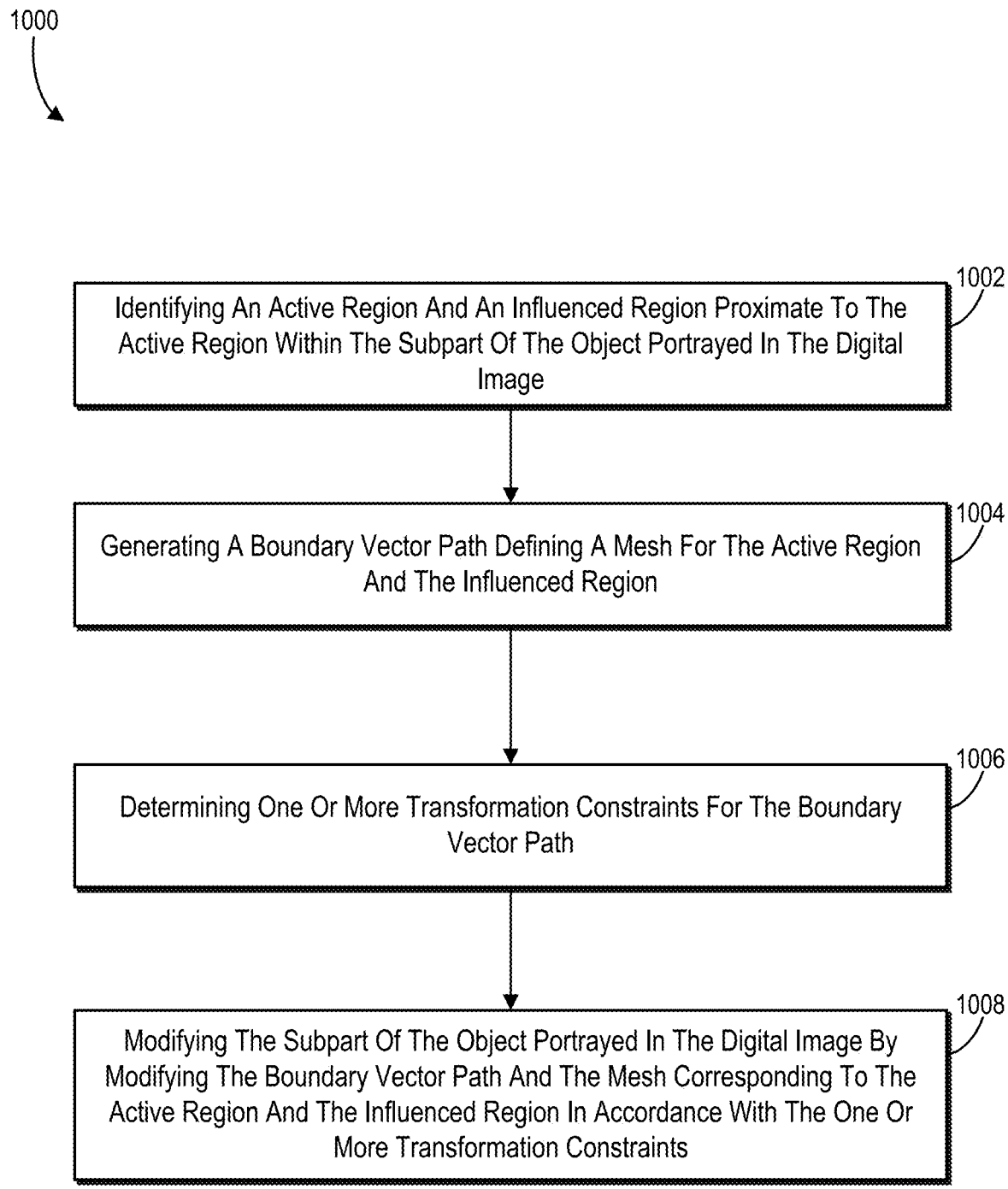
FIG. 10 illustrates a flowchart of a series of acts for modifying a subpart of an object portrayed in a digital image in accordance with one or more embodiments.

FIGS. 1-9, the corresponding text, and the examples provide several different systems, methods, techniques, components, and/or devices of the part-level transformation system 106 in accordance with one or more embodiments. In addition to the above description, one or more embodiments can also be described in terms of flowcharts including acts for accomplishing a particular result. For example, FIG. 10 illustrates a flowchart of a series of acts 1000 for modifying a subpart of an object portrayed in a digital image in accordance with one or more embodiments. The part-level transformation system 106 may perform one or more acts of the series of acts 1000 in addition to or alternatively to one or more acts described in conjunction with other figures. While FIG. 10 illustrates acts according to one embodiment, alternative embodiments may omit, add to, reorder, and/or modify any of the acts shown in FIG. 10. The acts of FIG. 10 can be performed as part of a method. Alternatively, a non-transitory computer-readable medium can comprise instructions that, when executed by one or more processors, cause a computing device to perform the acts of FIG. 10. In some embodiments, a system can perform the acts of FIG. 10.

As shown, the series of acts 1000 includes an act 1002 of identifying an active region and an influenced region proximate to the active region within the subpart of the object portrayed in the digital image. In some embodiments, identifying the active region and the influenced region comprises: providing the digital image for display via a digital image editing interface; and identifying, via the digital image editing interface, a first user interaction corresponding to the active region and a second user interaction corresponding the influenced region.

The series of acts 1000 also includes an act 1004 of generating a boundary vector path defining a mesh for the active region and the influenced region. In some embodiments, generating the boundary vector path comprises generating an active path segment corresponding to the active region and a deformable path segment corresponding to the influenced region. Additionally or alternatively, in certain implementations, generating the boundary vector path comprises: generating anchor points at junctions of a plurality of path segments along a perimeter of the subpart of the object; determining, from the anchor points, an intersection anchor point where the active region joins the influenced region; and determining, from the anchor points, a corner anchor point joining a set of connected path segments of the plurality of path segments that satisfy at least one of a threshold segment length or a threshold curvature deviation.

In addition, the series of acts 1000 includes an act 1006 of determining one or more transformation constraints for the boundary vector path. In some embodiments, determining the one or more transformation constraints comprises determining a first transformation constraint corresponding to the active path segment and determining a second transformation constraint corresponding to the deformable path segment. In certain implementations, the first transformation constraint comprises a fixed affine constraint. Further, in some embodiments, the second transformation constraint comprises a similarity transform constraint.

For example, the act 1006 comprises determining the first transformation constraint for the active path segment based on a slope threshold corresponding to a slope of the active path segment of the boundary vector path. As another example, the act 1006 comprises determining the first transformation constraint for the active path segment by determining at least one of a fixed affine constraint to constrain the active path segment to a fixed affine transformation or a first continuity constraint that preserves a C1 smoothness continuity or a G1 curvature continuity across the active path segment.

In yet another example, the act 1006 comprises determining the second transformation constraint for the deformable path segment by determining at least one of a similarity transform constraint to constrain the deformable path segment to a nearest similarity transform or a second continuity constraint that preserves a C1 smoothness continuity or a G1 curvature continuity across the deformable path segment.

The series of acts 1000 further includes an act 1008 of modifying the subpart of the object portrayed in the digital image by modifying the boundary vector path and the mesh corresponding to the active region and the influenced region in accordance with the one or more transformation constraints (e.g., in response to detecting a user interaction with the active region). In certain implementations, the act 1008 comprises modifying the boundary vector path and the mesh corresponding to the active region and the influenced region in accordance with the first transformation constraint and the second transformation constraint.

For example, modifying the boundary vector path and the mesh comprises modifying the boundary vector path and the mesh in accordance with the first transformation constraint by constraining the active path segment to a fixed affine transformation. As another example, modifying the boundary vector path and the mesh comprises modifying the boundary vector path and the mesh in accordance with the second transformation constraint by constraining the deformable path segment to a nearest similarity transform. In yet another example, modifying the subpart of the object comprises translating the active path segment of the boundary vector path along a translation line with a slope that satisfies the slope threshold. Still further, another example of modifying the subpart comprises utilizing a shape-aware transform solver to process the first transformation constraint, the second transformation constraint, and translation data corresponding to the user interaction.

It is understood that the outlined acts in the series of acts 1000 are only provided as examples, and some of the acts may be optional, combined into fewer acts, or expanded into additional acts without detracting from the essence of the disclosed embodiments. Additionally, the acts described herein may be repeated or performed in parallel with one another or in parallel with different instances of the same or similar acts. As an example of an additional act not shown in FIG. 10, act(s) in the series of acts 1000 may include an act of: generating an active path segment by identifying a first path segment of the plurality of path segments that extends between the intersection anchor point and an anchor point; and generating a deformable path segment by identifying a second path segment of the plurality of path segments that extends between the intersection anchor point and the corner anchor point.

As another example of an additional act not shown in FIG. 10, act(s) in the series of acts 1000 may include an act of determining a fixed path segment by identifying a third path segment of the plurality of path segments extending between the corner anchor point and an additional anchor point.

In yet another example of an additional act not shown in FIG. 10, act(s) in the series of acts 1000 may include an act of: providing, for display within a digital image editing user interface, the digital image and a transformation handle corresponding to the active path segment; and in response to detecting a user interaction with the transformation handle, modifying the subpart of the object portrayed in the digital image by translating the active path segment and deforming the deformable path segment in accordance with the one or more transformation constraints.

As an additional example of an act not shown in FIG. 10, act(s) in the series of acts 1000 may include an act of: providing, for display within a digital image editing user interface, the digital image and a segmentation corresponding to the object; identifying, based on user interaction with the segmentation, an active region and an influenced region of a subpart of the plurality of subparts of the object; generating a boundary vector path comprising an active path segment corresponding to the active region and a deformable path segment corresponding to the influenced region; determining a first transformation constraint for the active path segment and a second transformation constraint corresponding to the deformable path segment; and in response to a user interaction with the active path segment via the digital image editing user interface, modifying the subpart by translating the active path segment and deforming the deformable path segment in accordance with the first transformation constraint and the second transformation constraint.

As one example of an additional act not shown in FIG. 10, act(s) in the series of acts 1000 may include an act of generating an active path segment of the boundary vector path by: generating anchor points at junctions of a plurality of path segments along a perimeter of the subpart of the object; determining, from the anchor points, an intersection anchor point where the active region joins the influenced region; and identifying a first path segment of the plurality of path segments that extends between the intersection anchor point and an anchor point.

As another example of an additional act not shown in FIG. 10, act(s) in the series of acts 1000 may include an act of generating a deformable path segment of the boundary vector path by: determining, from the anchor points, a corner anchor point joining a set of connected path segments of the plurality of path segments that satisfy at least one of a threshold segment length or a threshold curvature deviation; and identifying a second path segment of the plurality of path segments that extends between the intersection anchor point and the corner anchor point.

In yet another example of an additional act not shown in FIG. 10, act(s) in the series of acts 1000 may include an act of segmenting the digital image by utilizing a neural network to generate the segmentation based on a coarse user selection of the object.

Still further, in another example of an additional act not shown in FIG. 10, act(s) in the series of acts 1000 may include an act of: providing, for display within a digital image editing user interface, a digital image portraying an object and a segmentation corresponding to the object; identifying, based on a user interaction with the segmentation of the digital image editing user interface, an active region and an influenced region of a subpart of the object; and providing, for display within the digital image editing user interface, a modified digital image comprising the translated active region and the deformed influenced region.

In addition (or in the alternative) to the acts described above, in some embodiments, the series of acts 1000 can include performing a step for translating the active region and deforming the influenced region of the subpart of the object. For instance, the acts and algorithms described above in relation to FIGS. 3, 5A-5B, and 6 can comprise the corresponding acts (or structure) for performing a step for translating the active region and deforming the influenced region of the subpart of the object.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 11:
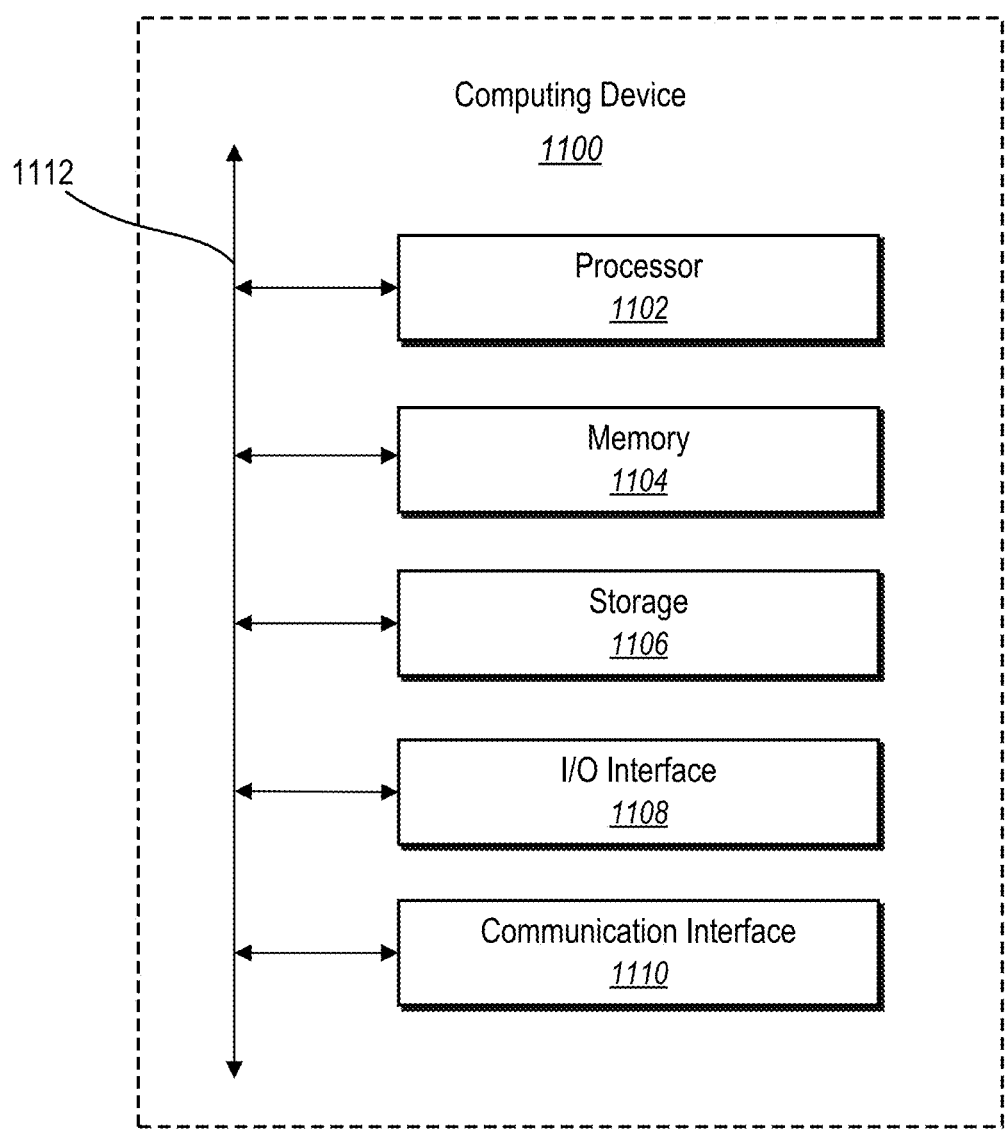
FIG. 11 illustrates a block diagram of an example computing device for implementing one or more embodiments of the present disclosure.

FIG. 11 illustrates a block diagram of an example computing device 1100 that may be configured to perform one or more of the processes described above. One will appreciate that one or more computing devices, such as the computing device 1100 may represent the computing devices described above (e.g., the server(s) 102, the client device 108, the computing device 700, and/or the computing device 900). In one or more embodiments, the computing device 1100 may be a mobile device (e.g., a mobile telephone, a smartphone, a PDA, a tablet, a laptop, a camera, a tracker, a watch, a wearable device, etc.). In some embodiments, the computing device 1100 may be a non-mobile device (e.g., a desktop computer or another type of client device). Further, the computing device 1100 may be a server device that includes cloud-based processing and storage capabilities.

As shown in FIG. 11, the computing device 1100 can include one or more processor(s) 1102, memory 1104, a storage device 1106, input/output interfaces 1108 (or "I/O interfaces 1108"), and a communication interface 1110, which may be communicatively coupled by way of a communication infrastructure (e.g., bus 1112). While the computing device 1100 is shown in FIG. 11, the components illustrated in FIG. 11 are not intended to be limiting. Additional or alternative components may be used in other embodiments. Furthermore, in certain embodiments, the computing device 1100 includes fewer components than those shown in FIG. 11. Components of the computing device 1100 shown in FIG. 11 will now be described in additional detail.

In particular embodiments, the processor(s) 1102 includes hardware for executing instructions, such as those making up a computer program. As an example, and not by way of limitation, to execute instructions, the processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1104 may be internal or distributed memory.

The computing device 1100 includes a storage device 1106 includes storage for storing data or instructions. As an example, and not by way of limitation, the storage device 1106 can include a non-transitory storage medium described above. The storage device 1106 may include a hard disk drive (HDD), flash memory, a Universal Serial Bus (USB) drive or a combination these or other storage devices.

As shown, the computing device 1100 includes one or more I/O interfaces 1108, which are provided to allow a user to provide input to (such as user strokes), receive output from, and otherwise transfer data to and from the computing device 1100. These I/O interfaces 1108 may include a mouse, keypad or a keyboard, a touch screen, camera, optical scanner, network interface, modem, other known I/O devices or a combination of such I/O interfaces 1108. The touch screen may be activated with a stylus or a finger.

The I/O interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1108 are configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 provides one or more interfaces for communication (such as, for example, packet-based communication) between the computing device and one or more other computing devices or one or more networks. As an example, and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can include hardware, software, or both that connects components of the computing device 1100 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable storage medium comprising instructions that, when executed by at least one processor, cause a computing device to modify a subpart of an object portrayed in a digital image by:
   identifying an active region and an influenced region proximate to the active region within the subpart of the object portrayed in the digital image;
   generating a boundary vector path comprising an active path segment and defining a mesh for the active region and the influenced region by:
      generating anchor points at junctions of a plurality of path segments along a perimeter of the subpart of the object;
      determining, from the anchor points, an intersection anchor point where the active region joins the influenced region; and
      generating the active path segment by identifying a first path segment of the plurality of path segments that extends between the intersection anchor point and an anchor point;
   determining one or more transformation constraints for the boundary vector path comprising the active path segment; and
   in response to detecting a user interaction with the active region, modifying the subpart of the object portrayed in the digital image by modifying the boundary vector path and the mesh corresponding to the active region and the influenced region in accordance with the one or more transformation constraints.

2. The non-transitory computer-readable storage medium of claim 1, further comprising instructions that, when executed by the at least one processor, cause the computing device to identify the active region and the influenced region by:
   providing the digital image for display via a digital image editing interface; and
   identifying, via the digital image editing interface, a first user interaction corresponding to the active region and a second user interaction corresponding the influenced region.

3. The non-transitory computer-readable storage medium of claim 1, further comprising instructions that, when executed by the at least one processor, cause the computing device to generate the boundary vector path by generating a deformable path segment.

4. The non-transitory computer-readable storage medium of claim 3, further comprising instructions that, when executed by the at least one processor, cause the computing device to:
   provide, for display within a digital image editing user interface, the digital image and a transformation handle corresponding to the active path segment; and
   in response to detecting a user interaction with the transformation handle, modify the subpart of the object portrayed in the digital image by translating the active path segment and deforming the deformable path segment in accordance with the one or more transformation constraints.

5. The non-transitory computer-readable storage medium of claim 3, further comprising instructions that, when executed by the at least one processor, cause the computing device to:
determine the one or more transformation constraints by determining a first transformation constraint corresponding to the active path segment and determining a second transformation constraint corresponding to the deformable path segment; and
modify the boundary vector path and the mesh corresponding to the active region and the influenced region in accordance with the first transformation constraint and the second transformation constraint.

6. The non-transitory computer-readable storage medium of claim 5, wherein the first transformation constraint comprises a fixed affine constraint, and further comprising instructions that, when executed by the at least one processor, cause the computing device to modify the boundary vector path and the mesh in accordance with the first transformation constraint by constraining the active path segment to a fixed affine transformation.

7. The non-transitory computer-readable storage medium of claim 5, wherein the second transformation constraint comprises a similarity transform constraint, and further comprising instructions that, when executed by the at least one processor, cause the computing device to modify the boundary vector path and the mesh in accordance with the second transformation constraint by constraining the deformable path segment to a nearest similarity transform.

8. The non-transitory computer-readable storage medium of claim 1, further comprising instructions that, when executed by the at least one processor, cause the computing device to generate the boundary vector path by:
determining, from the anchor points, a corner anchor point joining a set of connected path segments of the plurality of path segments that satisfy at least one of a threshold segment length or a threshold curvature deviation.

9. The non-transitory computer-readable storage medium of claim 8, further comprising instructions that, when executed by the at least one processor, cause the computing device to:
generate a deformable path segment by identifying a second path segment of the plurality of path segments that extends between the intersection anchor point and the corner anchor point.

10. The non-transitory computer-readable storage medium of claim 9, further comprising instructions that, when executed by the at least one processor, cause the computing device to determine a fixed path segment by identifying a third path segment of the plurality of path segments extending between the corner anchor point and an additional anchor point.

11. A system comprising:
one or more memory devices comprising a digital image portraying an object having a plurality of subparts; and
one or more processors configured to cause the system to:
provide, for display within a digital image editing user interface, the digital image and a segmentation corresponding to the object;
identify, based on user interaction with the segmentation, an active region and an influenced region of a subpart of the plurality of subparts of the object;
generate an active path segment by:
generating anchor points at junctions of a plurality of path segments along a perimeter of the subpart of the object;
determining, from the anchor points, an intersection anchor point where the active region joins the influenced region; and
identifying a first path segment of the plurality of path segments that extends between the intersection anchor point and an anchor point;
generate a boundary vector path comprising the active path segment corresponding to the active region and a deformable path segment corresponding to the influenced region;
determine a first transformation constraint for the active path segment and a second transformation constraint corresponding to the deformable path segment; and
in response to a user interaction with the active path segment via the digital image editing user interface, modify the subpart by translating the active path segment and deforming the deformable path segment in accordance with the first transformation constraint and the second transformation constraint.

12. The system of claim 11, wherein the one or more processors are configured to cause the system to generate the deformable path segment of the boundary vector path by:
determining, from the anchor points, a corner anchor point joining a set of connected path segments of the plurality of path segments that satisfy at least one of a threshold segment length or a threshold curvature deviation; and
determining a deformable path segment by identifying a second path segment of the plurality of path segments that extends between the intersection anchor point and the corner anchor point.

13. The system of claim 11, wherein the one or more processors are configured to cause the system to:
determine the first transformation constraint for the active path segment based on a slope threshold corresponding to a slope of the active path segment of the boundary vector path; and
modify the subpart of the object by translating the active path segment of the boundary vector path along a translation line with a slope that satisfies the slope threshold.

14. The system of claim 11, wherein the one or more processors are configured to cause the system to determine the first transformation constraint for the active path segment by determining at least one of a fixed affine constraint to constrain the active path segment to a fixed affine transformation or a first continuity constraint that preserves a C1 smoothness continuity or a G1 curvature continuity across the active path segment.

15. The system of claim 11, wherein the one or more processors are configured to cause the system to determine the second transformation constraint for the deformable path segment by determining at least one of a similarity transform constraint to constrain the deformable path segment to a nearest similarity transform or a second continuity constraint that preserves a C1 smoothness continuity or a G1 curvature continuity across the deformable path segment.

16. The system of claim 11, wherein the one or more processors are configured to cause the system to modify the subpart by utilizing a shape-aware transform solver to process the first transformation constraint, the second transformation constraint, and translation data corresponding to the user interaction.

17. The system of claim 11, wherein the one or more processors are configured to cause the system to segment the digital image by utilizing a neural network to generate the segmentation based on a coarse user selection of the object.

18. A computer-implemented method comprising:
providing, for display within a digital image editing user interface, a digital image portraying an object and a segmentation corresponding to the object;
identifying, based on a user interaction with the segmentation of the digital image editing user interface, an active region and an influenced region of a subpart of the object;
generating a boundary vector path comprising an active path segment and defining a mesh for the active region and the influenced region by:
   generating anchor points at junctions of a plurality of path segments along a perimeter of the subpart of the object;
   determining, from the anchor points, an intersection anchor point where the active region joins the influenced region; and
   generating the active path segment by identifying a first path segment of the plurality of path segments that extends between the intersection anchor point and an anchor point;
determining one or more transformation constraints for the boundary vector path comprising the active path segment; and
in response to detecting a user interaction, modifying the subpart of the object portrayed in the digital image by modifying the boundary vector path and the mesh corresponding to the active region and the influenced region in accordance with the one or more transformation constraints.

19. The computer-implemented method of claim 18, further comprising segmenting the digital image utilizing a neural network to generate the segmentation corresponding to the object portrayed in the digital image.

20. The computer-implemented method of claim 18, further comprising:
determining, from the anchor points, a corner anchor point joining a set of connected path segments of the plurality of path segments that satisfy at least one of a threshold segment length or a threshold curvature deviation; and
determining a deformable path segment by identifying a second path segment of the plurality of path segments that extends between the intersection anchor point and the corner anchor point.

* * * * *